(12) United States Patent
Chen et al.

(10) Patent No.: US 8,411,469 B2
(45) Date of Patent: *Apr. 2, 2013

(54) SWITCHING POWER SOURCE DEVICE AND SWITCHING POWER SOURCE CONTROL CIRCUIT

(75) Inventors: Jian Chen, Matsumoto (JP); Koji Sonobe, Matsumoto (JP)

(73) Assignee: Fuji Electric Co., Ltd., Kawasaki-Shi (JP)

(*) Notice: Subject to any disclaimer, the term of this patent is extended or adjusted under 35 U.S.C. 154(b) by 711 days.

This patent is subject to a terminal disclaimer.

(21) Appl. No.: 12/591,776

(22) Filed: Dec. 1, 2009

(65) Prior Publication Data

US 2010/0142229 A1 Jun. 10, 2010

(30) Foreign Application Priority Data

Dec. 2, 2008 (JP) ................................. 2008-307571
Aug. 17, 2009 (JP) ................................. 2009-188367

(51) Int. Cl.
*H02M 3/335* (2006.01)
(52) U.S. Cl. .................. 363/21.06; 363/127; 363/21.02
(58) Field of Classification Search .................. 363/16, 363/127, 21.02, 21.03, 21.14, 21.06
See application file for complete search history.

(56) References Cited

U.S. PATENT DOCUMENTS

| 7,184,280 | B2 | 2/2007 | Sun et al. | |
|---|---|---|---|---|
| 7,859,860 | B2* | 12/2010 | Chen et al. | 363/16 |
| 8,243,473 | B2* | 8/2012 | Chen et al. | 363/16 |
| 2005/0122753 | A1 | 6/2005 | Soldano | |
| 2008/0055942 | A1 | 3/2008 | Tao et al. | |

FOREIGN PATENT DOCUMENTS

| JP | 2002-369516 | 12/2002 |
|---|---|---|
| JP | 2005-198375 | 7/2005 |
| JP | 2005-198438 | 7/2005 |

* cited by examiner

*Primary Examiner* — Harry Behm
*Assistant Examiner* — Matthew Grubb
(74) *Attorney, Agent, or Firm* — Manabu Kanesaka

(57) ABSTRACT

A switching power source device which has main switch elements which switch a current path of the series resonant circuit, and a transformer which induces a current to a secondary side, controls the main switch elements on a primary side. Synchronous rectification switch elements are turned ON and OFF in response to one of the main switch elements. A synchronous control circuit which turns the synchronous rectification switch element ON in synchronization with an ON timing of the main switch element, or a conduction timing of internal diodes in the synchronous rectification switch elements detected by an inter-terminal voltage signal of the synchronous rectification switch element, whichever timing is later, determines a maximum ON width of the synchronous rectification switch element in accordance with a delay time of the conduction timing of the internal diodes with respect to the ON timing of the main switch element.

11 Claims, 27 Drawing Sheets

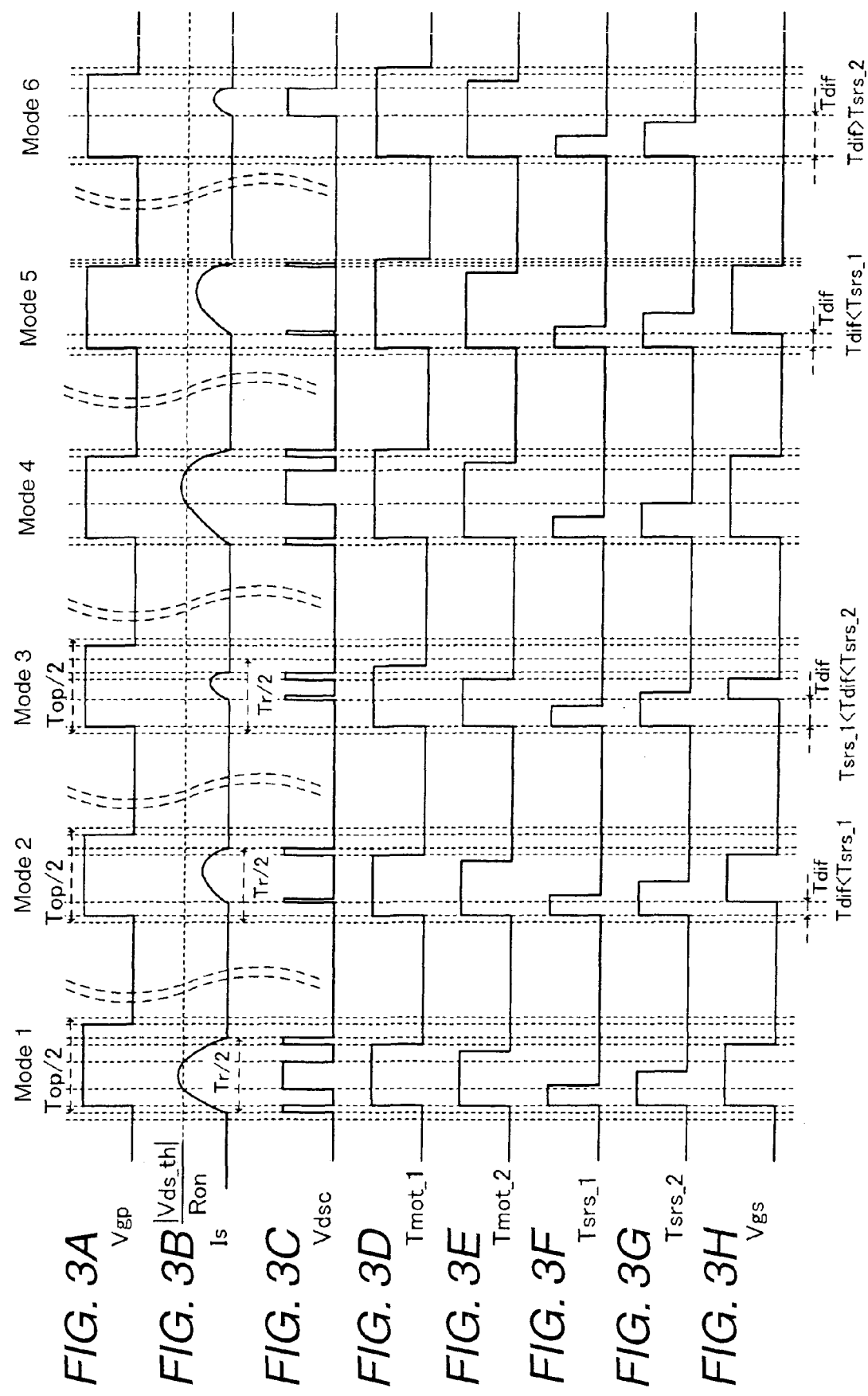

GATE SIGNAL Vgp

FIRST REFERENCE TIME SIGNAL Tsrs_1

SECOND REFERENCE TIME SIGNAL Tsrs_2

LEVEL DETECTION SIGNAL Vdsc

CONSTANT CURRENT SOURCE 53 CONTROL SIGNAL V_S2

CAPACITOR CHARGING VOLTAGE V_C1

MAXIMUM ON WIDTH FINISH SIGNAL Tmot_X

SYNCHRONOUS DRIVE SIGNAL Vgs

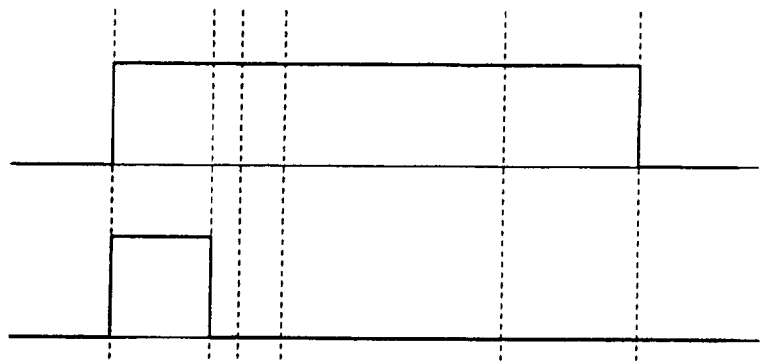
FIG. 8A
GATE SIGNAL Vgp
FIG. 8B
FIRST REFERENCE
TIME SIGNAL Tsrs_1
FIG. 8C
SECOND REFERENCE
TIME SIGNAL Tsrs_2
FIG. 8D
LEVEL DETECTION
SIGNAL Vdsc
FIG. 8E
SWITCH S2 CONTROL
SIGNAL V_S2
FIG. 8F
CAPACITOR CHARGING
VOLTAGE V_C1
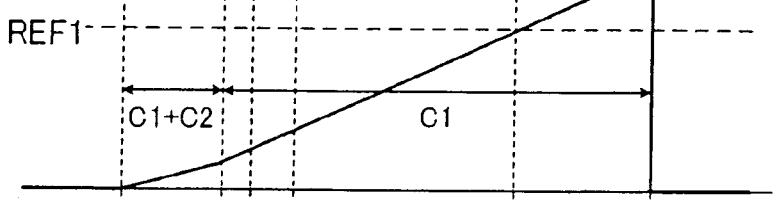
FIG. 8G
MAXIMUM ON WIDTH
FINISH SIGNAL Tmot_X
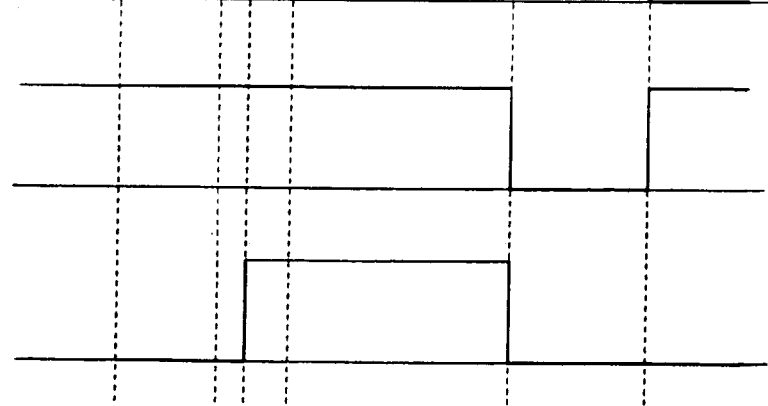
FIG. 8H
SYNCHRONOUS DRIVE
SIGNAL Vgs
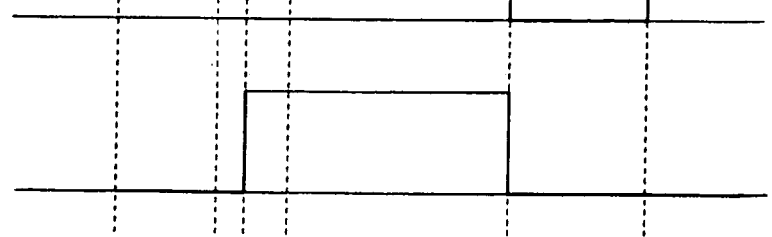

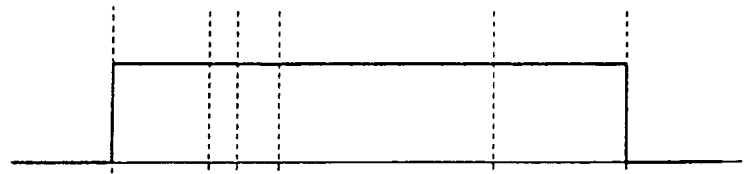
*FIG. 10A*
GATE SIGNAL Vgp
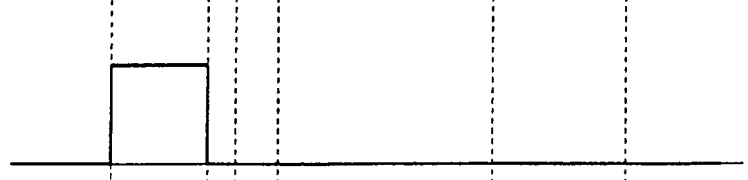
*FIG. 10B*
FIRST REFERENCE
TIME SIGNAL Tsrs_1
*FIG. 10C*
SECOND REFERENCE
TIME SIGNAL Tsrs_2
*FIG. 10D*
LEVEL DETECTION
SIGNAL Vdsc
*FIG. 10E*
SWITCH S2 CONTROL
SIGNAL V_S2
*FIG. 10F*
VARIABLE REFERENCE
VOLTAGE REF_mot
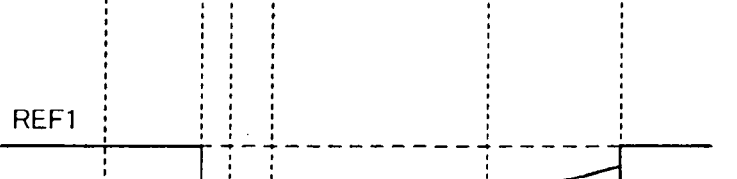
*FIG. 10G*
CAPACITOR CHARGING
VOLTAGE V_C1
*FIG. 10H*
MAXIMUM ON WIDTH
FINISH SIGNAL Tmot_X
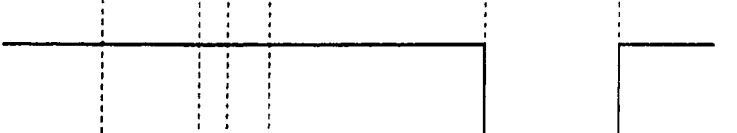
*FIG. 10I*
SYNCHRONOUS DRIVE
SIGNAL Vgs
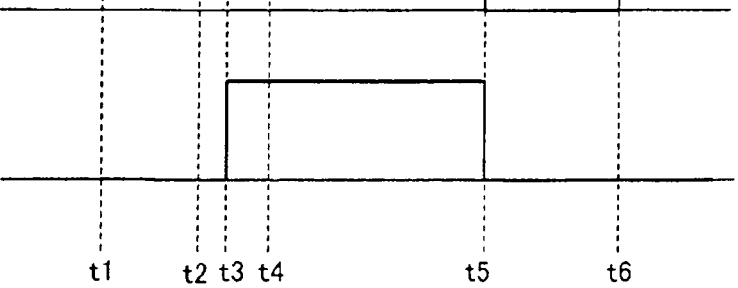

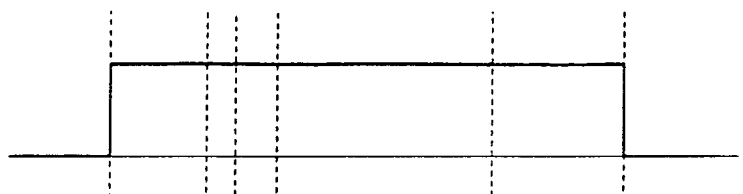
FIG. 12A
GATE SIGNAL Vgp
FIG. 12B
FIRST REFERENCE
TIME SIGNAL Tsrs_1
FIG. 12C
SECOND REFERENCE
TIME SIGNAL Tsrs_2
FIG. 12D
THIRD REFERENCE
TIME SIGNAL Tsrs_dif
FIG. 12E
LEVEL DETECTION
SIGNAL Vdsc
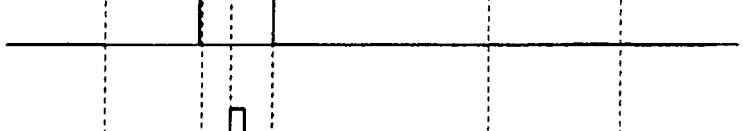
FIG. 12F
VOLTAGE SWITCHING
SIGNAL S_mot
FIG. 12G
SECOND SWITCHING
SIGNAL Q_mot
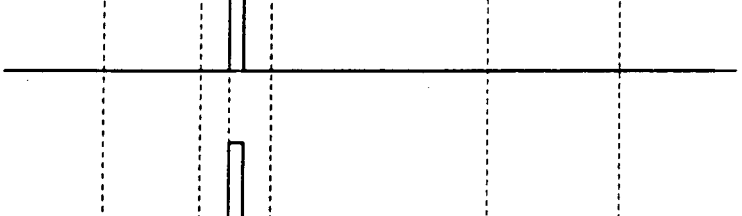
FIG. 12H
VARIABLE REFERENCE
VOLTAGE REF_mot
FIG. 12I
CAPACITOR CHARGING
VOLTAGE V_C1
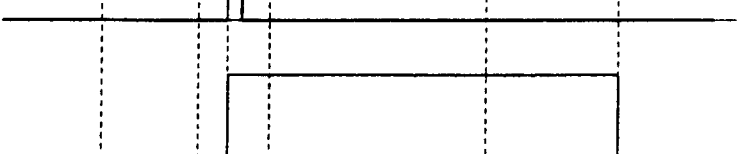
FIG. 12J
MAXIMUM ON WIDTH
FINISH SIGNAL Tmot_X
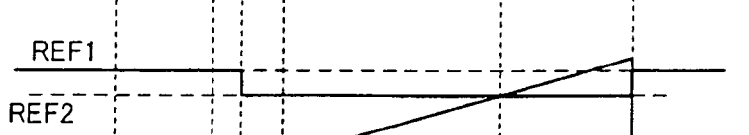
FIG. 12K
SYNCHRONOUS DRIVE
SIGNAL Vgs
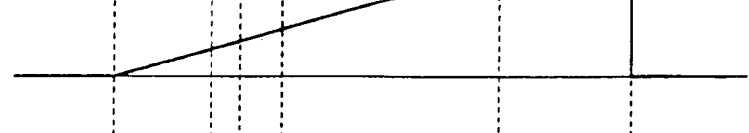
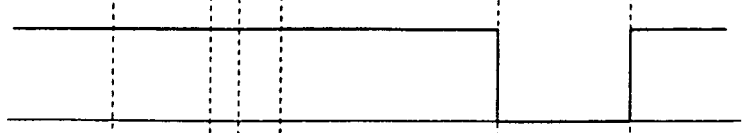
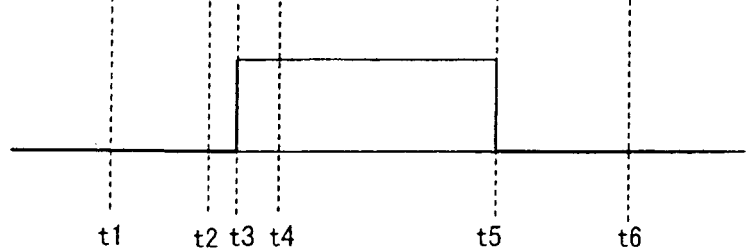

GATE SIGNAL Vgp

RESET SIGNAL R

REFERENCE TIME
SIGNAL Tsrs_0

LEVEL DETECTION
SIGNAL Vdsc

INVERTED OUTPUT
SIGNAL QB

CONDUCTION TIMING
DELAY TIME Tdif

REFERENCE TIME
SIGNAL Tsrs_X

CAPACITOR CHARGING
VOLTAGE V_C1

MAXIMUM ON WIDTH
FINISH SIGNAL Tmot_X

SYNCHRONOUS DRIVE
SIGNAL Vgs

FIG. 20
PRIOR ART

OPERATIONAL MODE CLASSIFICATIONS

| | HEAVY LOAD (HL) | LIGHT LOAD (LL) | VERY LIGHT LOAD (VLL) |
|---|---|---|---|
| $fop < fr1$ | Mode 1 | Mode 2 | Mode 3 |
| $fop \geq fr1$ | Mode 4 | Mode 5 | Mode 6 | fop: OPERATION FREQUENCY
fr1: RESONANT FREQUENCY

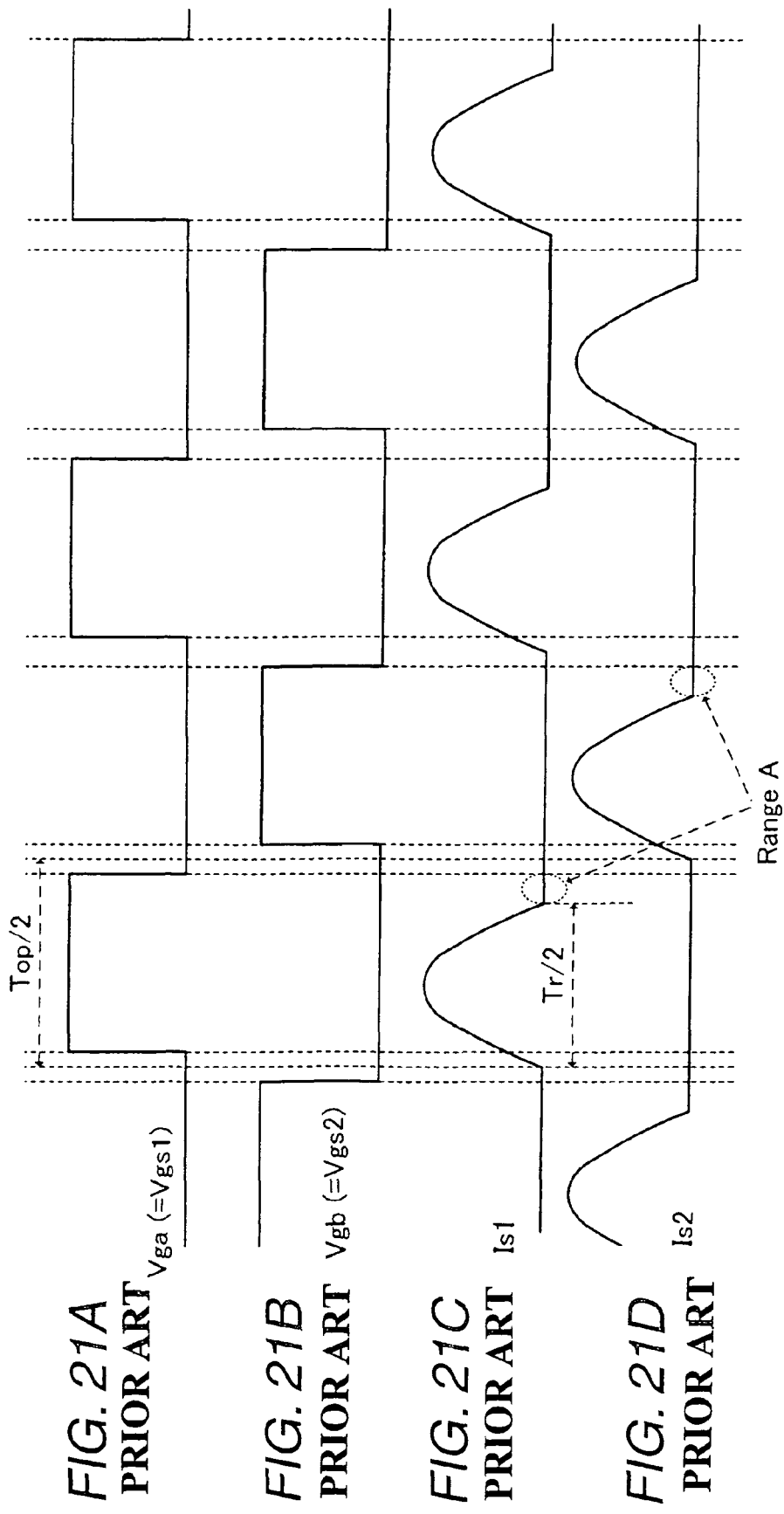

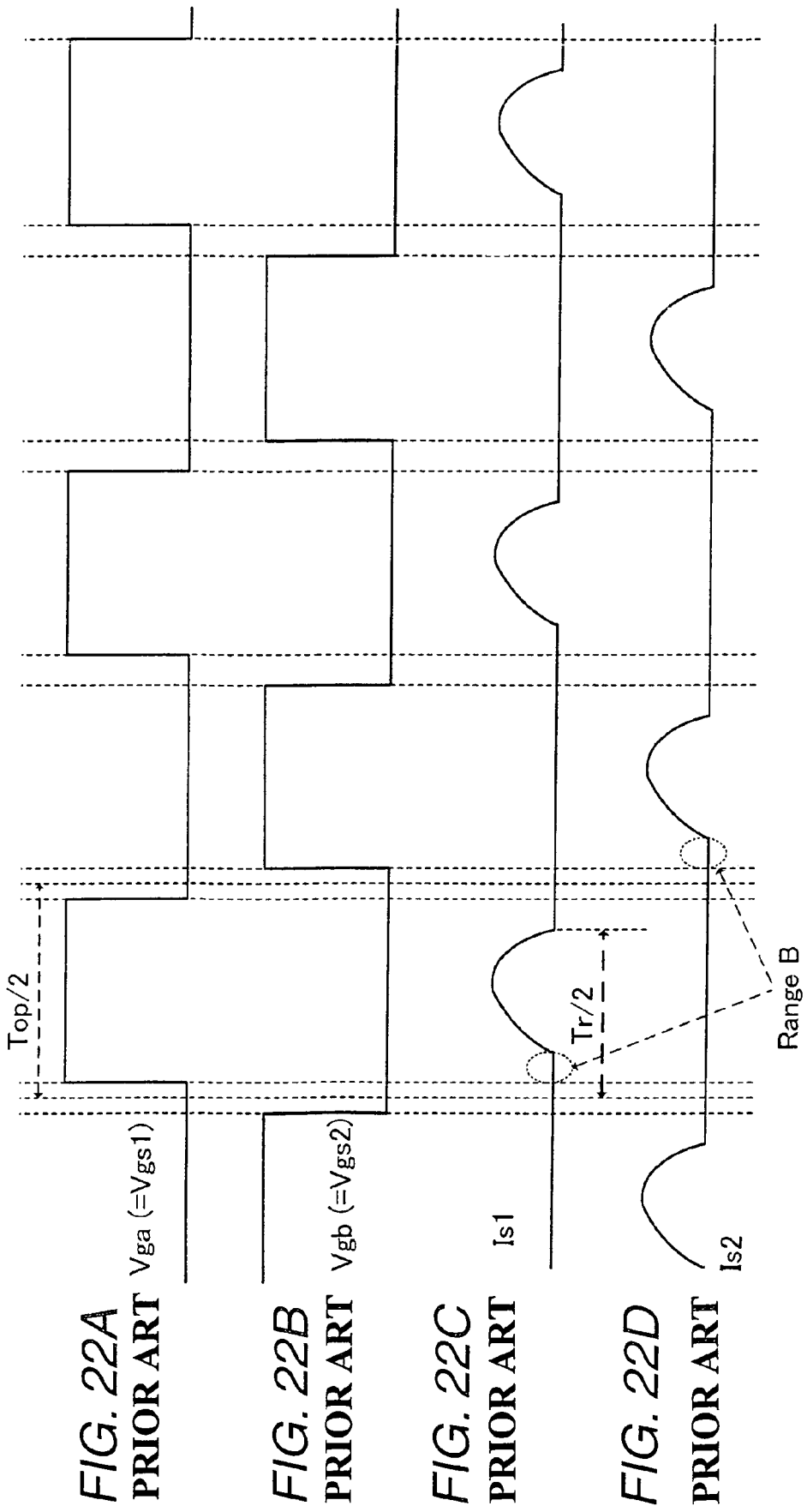

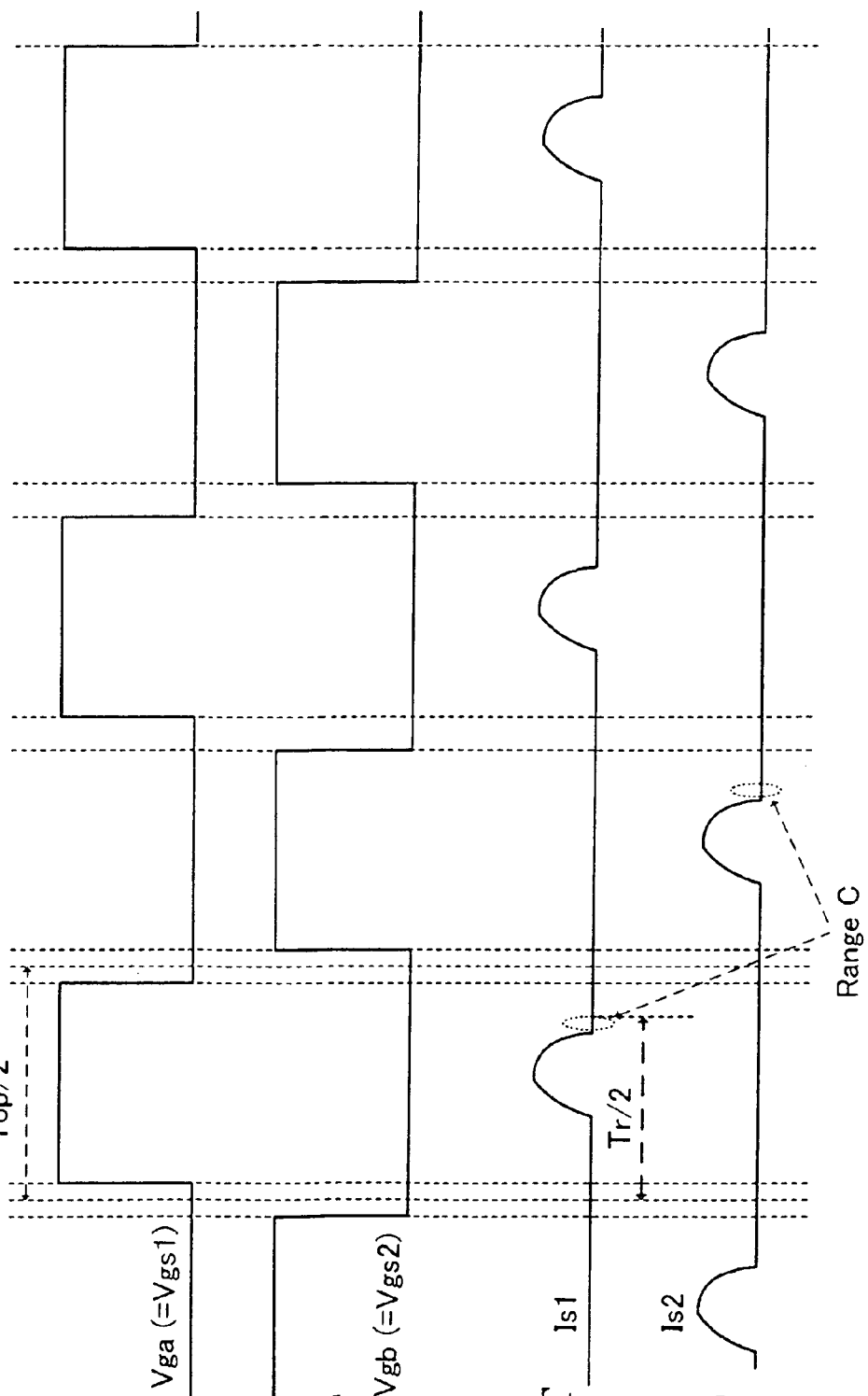
FIG. 23A PRIOR ART $V_{ga}(=V_{gs1})$
FIG. 23B PRIOR ART $V_{gb}(=V_{gs2})$
FIG. 23C PRIOR ART $I_{s1}$
FIG. 23D PRIOR ART $I_{s2}$
MODE 3 SECONDARY SIDE CURRENT WAVEFORM DIAGRAM

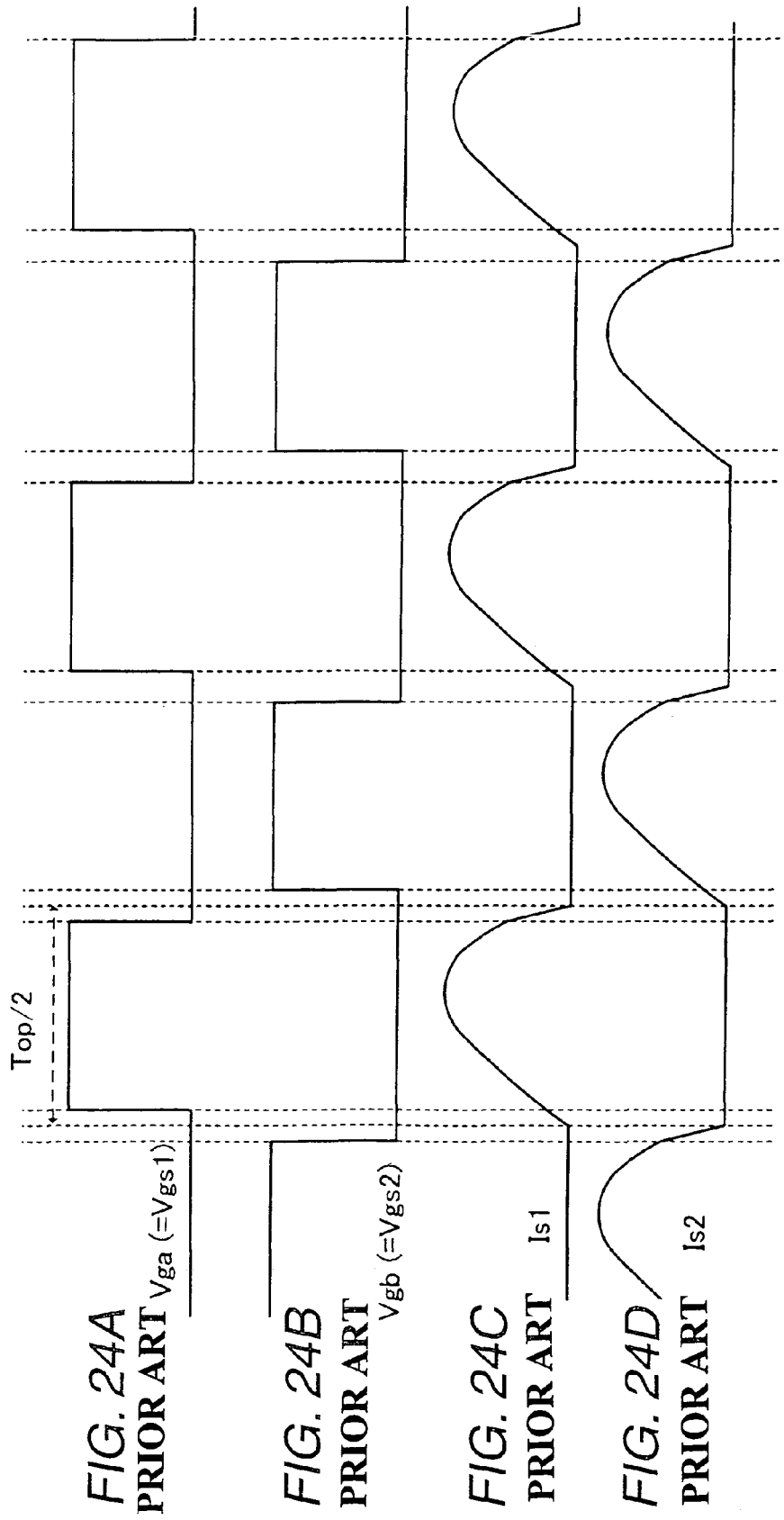

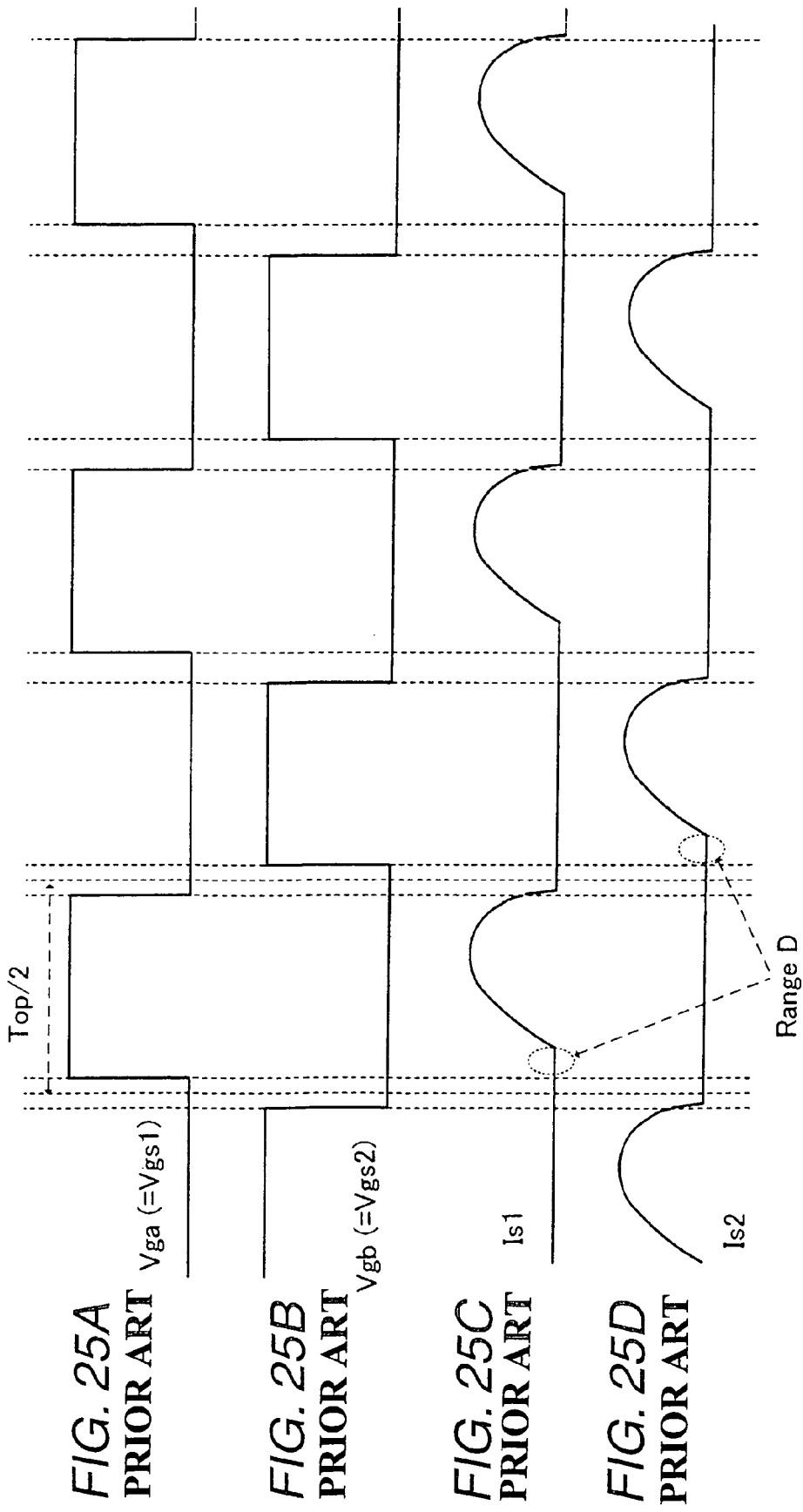

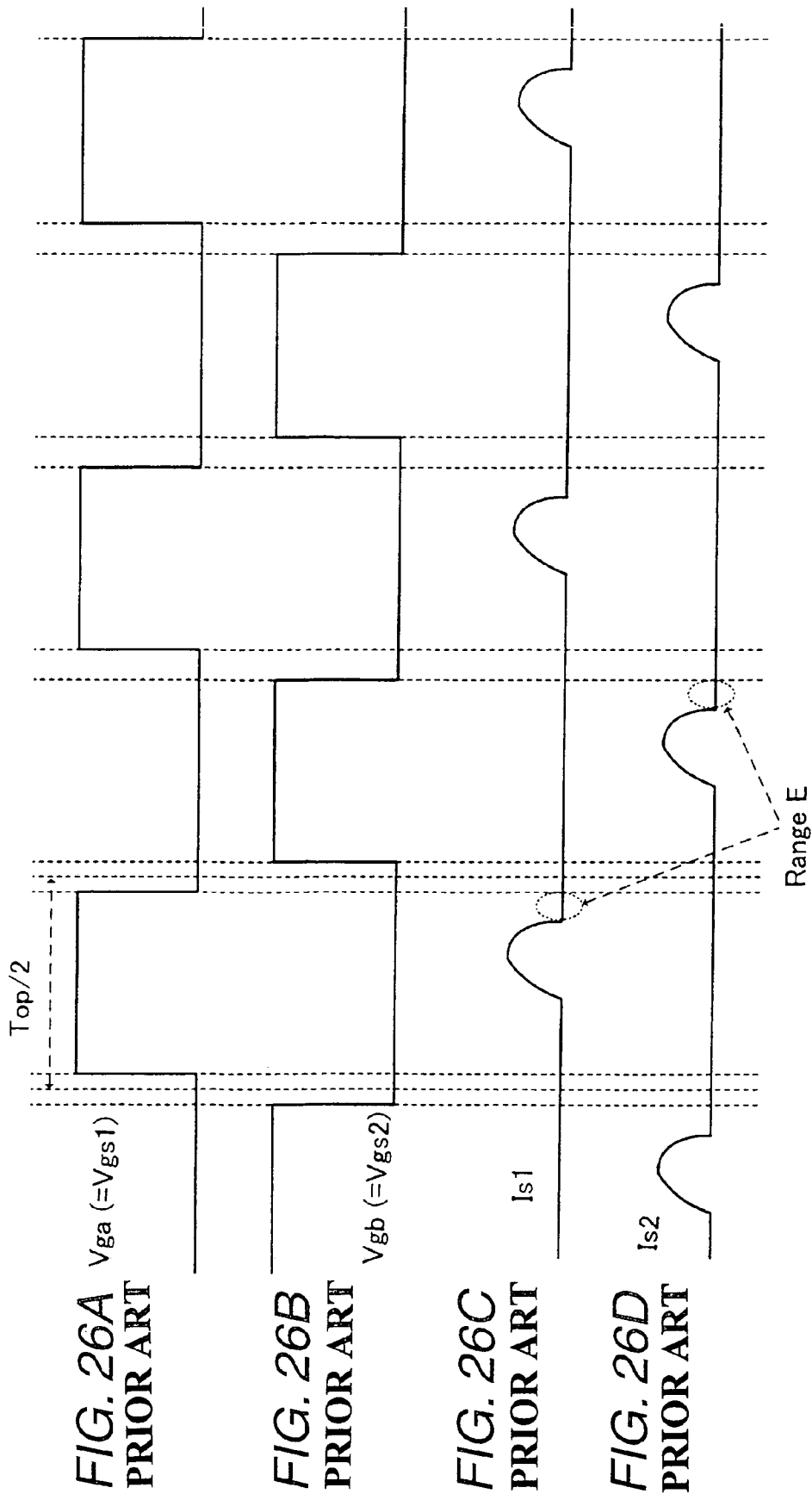

OPERATION WAVEFORM OF EACH PORTION

SYNCHRONOUS RECTIFICATION MOSFET CONTROL CIRCUIT

SWITCHING POWER SOURCE DEVICE AND SWITCHING POWER SOURCE CONTROL CIRCUIT

BACKGROUND OF THE INVENTION AND RELATED ART STATEMENT

The present invention relates to a switching power source device and a switching power source control circuit including a series resonant circuit which has a current resonant inductor and a current resonant capacitor, and in particular relates to a switching power source device and a switching power source control circuit which eliminate a reduction in power efficiency at a time of a very light load.

An existing switching power source device includes the kind of current resonant type converter shown in FIG. 18. In this current resonant type converter, an input direct voltage Vi is applied to a series resonant circuit which includes a resonant inductor Lr and a resonant capacitor Cr. By turning two main switch elements Qa and Qb which are configured as metal-oxide-semiconductor field-effect transistors (MOSFET), or the like, ON and OFF, it is possible to control a path of a primary side current flowing in a first coil L1 of a power converting transformer T, so that a current with a sinusoidal waveform flows in the first coil L1 of the transformer T. Also, rectification diodes D1 and D2, which rectify induced secondary currents Is1 and Is2 respectively, and an output capacitor $C_O$, which smoothes an output voltage $V_O$ to a load LD, are connected to a second coil L2 and a third coil L3 of the transformer T (wherein a coil ratio of L1:L2:L3 is taken to be n:1:1).

Furthermore, the output voltage $V_O$ to the load LD is returned to a drive circuit 3 for turning the main switch elements Qa and Qb ON and OFF, via an error amplifier 1 and a voltage control oscillation circuit (VCO) 2. This controls a current and voltage flowing in the first coil L1 of the transformer T, and controls the output voltage $V_O$ at a constant voltage.

The VCO 2 functions in such a way that, when the output voltage $V_O$ of the error amplifier 1, is higher than a set voltage, or is a light load, it increases an output frequency thereof, while when determining that the output voltage $V_O$ is lower than the set voltage, or is a heavy load, it reduces the output frequency thereof.

However, when using this kind of switching power source device as a low voltage, high current power source, the secondary currents Is1 and Is2 flow to the rectification diodes D1 and D2 provided on the secondary side of the transformer T. At this time, a large power loss $V_F \times I_O$ occurs due to a falling forward voltage $V_F$ of the rectification diodes D1 and D2. $I_O$ indicates a current value of either one of the secondary currents Is1 and Is2.

Therein, in a current resonant type converter shown in FIG. 19, a separately excited drive type of current resonant circuit is used in which MOSFETs Qs1 and Qs2, each of which has a low on resistance, are connected as synchronous rectification switch elements in place of the rectification diodes D1 and D2, a synchronous rectification is carried out, and the above-mentioned power loss is reduced. The MOSFETs Qs1 and Qs2 of FIG. 19 being individually ON-OFF controlled by the drive circuit 3 in synchronization with an operation frequency fop, which turns ON and OFF the primary side main switch elements Qa and Qb, the secondary currents Is1 and Is2 are alternately accumulated in the capacitor $C_O$.

Herein, discussion will be given with respect to separately excited drive synchronous rectification in the current resonant type converter of FIG. 19. In this arrangement the secondary side rectification diodes D1 and D2 in FIG. 18 are replaced with the MOSFETs Qs1 and Qs2, which have a low on resistance.

Synchronous rectification methods, include a self excitation drive method and a separate excitation drive method. Regarding the separate excitation drive method, inasmuch as it emits a drive signal in a logic circuit, by building the logic circuit into a power source IC, it is relatively easy for a power source maker to realize a synchronous rectification function. Consequently, all IC makers tend to devise various separate excitation drive methods (refer to U.S. Pat. No. 7,184,280, U.S. Patent Application Publication No. 2008/0055942, U.S. Patent Application Publication No. 2005/0122753, JP-A-2005-198438, and JP-A-2005-198375, to be described hereafter).

As this kind of heretofore known switching power source device is configured in such a way as to cause a switching operation of the main switch elements Qa and Qb, and obtain an optional direct current output via the voltage converting transformer T, depending on a size of the load LD connected to the secondary side, and the like, a charge accumulated in the capacitor $C_O$ is discharged and a current flowing back to the transformer T side (a reverse current) occurs. This causes a power loss in a reverse flow area which creates a shortcoming.

When considering separate excitation drive synchronous rectification, it will be presumed that it is sufficient that synchronous drive signals of the MOSFETs Qs1 and Qs2 are synchronized with the gate signals which switching control the main switch elements Qa and Qb. However, in actual practice, unless a reverse flow area is detected in each operational mode, and a conversion made to a drive signal synchronized with each one, the charge accumulated in the output capacitor $C_O$ is discharged, a current flowing back to the transformer T side (a reverse current) occurs, and a drop in efficiency occurs. Furthermore, there also emerges a danger of circuit breakage/damage due to the power flowing back to the primary side.

In the current resonant type converter of FIG. 19, the transformer T of the current resonant type converter of FIG. 18 is shown divided into an exciting inductance element Lm and an ideal transformer Ti. The operating principle thereof is clearly illustrated. Herein, prior to a description of the heretofore mentioned power loss in the reverse flow area, a description will be given of the operating principle of the current resonant type converter.

With the illustrated current resonant type converter, two kinds of basic current resonant frequency fr1 and fr2 are defined, as in the following Expressions (1) and (2). Herein, Lr, Lm, and Cr are taken to be, respectively, an inductance of the resonant inductor Lr, the exciting inductance element of the transformer T, and a capacitance of the resonant capacitor Cr.

$$fr1 = \frac{1}{2\pi\sqrt{Lr \cdot Cr}} \quad (1)$$

$$fr2 = \frac{1}{2\pi\sqrt{(Lr + Lm) \cdot Cr}} \quad (2)$$

With the switching power source device of FIG. 19, when there is a supply of power to the load LD, the voltage of the exciting inductance element Lm of the transformer T being clamped at $n \times (V_O + V_F)$ in accordance with the output voltage $V_O$, the exciting inductance element Lm is not involved in the current resonance, and power is supplied to the secondary side by operating at the first resonant frequency fr1 (refer to Expression (1) above) decided by the resonant capacitor Cr and resonant inductor Lr. In this case; a sum of a current Im and a resonant current Ir flowing in the exciting inductance element Lm, flows as a charge-discharge current to the resonant capacitor Cr. At this time, the operation frequency fop of the main switch elements Qa and Qb is controlled by the VCO 2 so as to stabilize the output voltage $V_O$.

The second resonant frequency fr2 (refer to Expression (2) above) being a resonant frequency when no supply of power is carried out to the load LD connected to the secondary side of the transformer T, as the ideal transformer Ti does not function as a transformer, and the voltage of the exciting inductance element Lm of the transformer T is not clamped, a resonance operation is carried out mainly by the capacitance Cr of the resonant capacitor Cr, the resonant inductance Lr of the resonant inductor Lr, and the exciting inductance element Lm.

Regarding the specific resonance operation of the current resonant type converter, it is possible to consider it as being divided into six operational modes (Modes 1 to 6), as shown in FIG. 20, depending on a relationship between its operation frequency fop and the first resonant frequency fr1 (hereafter simply referred to as resonant frequency), and on the size of the load LD connected to the secondary side of the transformer T.

That is, in FIG. 20, Modes 1 to 3 are cases in which the operation frequency fop is lower than the resonant frequency fr1, while Modes 4 to 6 are cases in which the operation frequency fop is equal to, or higher than, the resonant frequency fr1. Also, there is assumed to be a heavy load (HL) condition in the event that the size of the connected load LD is more than 50% of a rated load (maximum load) of the switching power source device, a light load (LL) condition in the event that the size is 20% to 50%, and a very light load (VLL) condition in the event that the size is less than 20%.

Hereafter with reference to FIGS. 21 to 26, a description will be given of a secondary side current waveform induced via the transformer T in each operational mode.

Herein, the reverse flow area in each operational mode is decided by the relationship between the operation frequency fop and resonant frequency fr1 of the current resonant type converter, and by the load LD. Of these, the operation frequency fop changes depending on circuit parameters and the load condition. However, the resonant frequency fr1 is decided by the size of the resonant capacitor Cr and resonant inductor Lr.

Consequently, although a synchronous rectification, which perfectly synchronizes the kinds of synchronous drive signal Vgs1 and Vgs2 shown in FIG. 19 with a power switching signal of the main switch elements Qa and Qb, is simple, the following five reverse flow areas become a problem, and a countermeasure is needed to eliminate the same.

That is, the switching power source device which turns the two main switch elements Qa and Qb ON and OFF using the gate signals Vga and Vgb respectively, and supplies the secondary currents Is1 and Is2, cannot prevent the secondary currents Is1 and Is2 from flowing back in the first operational mode (Mode 1) shown in FIG. 21, unless it reliably turns OFF each of the synchronous control MOSFETs Qs1 and Qs2 at the timings of a latter half of each half cycle (Top/2) of the switching operation. This is because, as the operation frequency fop and resonant frequency fr1 are in the relationship of fop<fr1 in the first operational mode, even though a resonance operation half cycle (Tr/2) is finished, the half cycle (Top/2) of the switching operation is not yet finished.

Consequently, in the event that the kinds of gate signal Vga and Vgb shown in A and B of FIG. 21 are output as they are as synchronous drive signals Vgs 1 and Vgs 2 Lo the synchronous rectification MOSFETs Qs1 and Qs2 shown in FIG. 19, a reverse flow current flows in this timing area (Range A).

Also, in the case of the second operational mode (Mode 2), in which the operation frequency fop is lower than the resonant frequency fr1, and also, the load LD is in the light load (LL) condition, apart from Range A in which the reverse current occurs shown in FIG. 21, there is also a danger of the reverse current occurring in Range B (an area of a timing immediately after the main switch element Qa or Qb is turned on) shown in FIG. 22. This is because with the current resonant type converter, upon the load LD becoming lighter to an extent, the start (timing) of the resonance operation becomes delayed with respect to a start of the switching operation. Then, an operation is depicted wherein, on the load LD becoming lighter still, the start timing of the resonance operation also becomes increasingly delayed.

In the same way, in the case of the third operational mode (Mode 3), in which the operation frequency fop is lower than the resonant frequency fr1, and also, the load LD is in the even smaller very light load (VLL) condition, the reverse current occurs in Range A and Range B. Then, furthermore, although it is within a half cycle of a resonance cycle Tr shown in FIG. 23, the reverse current also occurs in Range C, which corresponds to an area in which the resonance is finished.

In the case of the fourth operational mode (Mode 4) shown in FIG. 24, the operation frequency fop is equal to or higher than the resonant frequency fr1, and also, the load LD is in the heavy load (HL) condition. In this case there is no danger of the reverse current occurring, because the secondary currents Is1 and Is2 are consecutive.

In the fifth operational mode (Mode 5) shown in FIG. 25, the operation frequency fop is equal to or higher than the resonant frequency fr1, and also, the load LD is in the light load (LL) condition. In this case, the reverse current occurs in Range D (an area of a timing immediately after the main switch element Qa or Qb is turned on).

Also, in the case of the sixth operational mode (Mode 6) of FIG. 26, in which the operation frequency fop is equal to or higher than the resonant frequency fr1, and also, there is the very light load (VLL) condition, the reverse current occurs in Range D shown in FIG. 25. Then, furthermore, the reverse current also occurs at a timing, in an area Range E of a period in which the two main switch elements Qa and Qb are each turned ON, at which no power is supplied to the secondary side. This is because, as an amount of energy fed to the secondary side is small in the very light load (VLL) condition, the resonance operation finishes in a short time.

Consequently, in the event of applying signals synchronized with the gate signals Vga and Vgb (the same signals) as the synchronous drive signals Vgs1 and Vgs2 to the synchronous rectification MOSFETs Qs1 and Qs2, as the reverse current occurs in each of the operational modes 1 to 3, and 5 and 6, it has been necessary to form individual synchronous drive signal Vgs 1 and Vgs 2 signal waveforms in the areas (Ranges A to E) corresponding thereto.

Therein, with the heretofore known switching power source device, there is provided a constant width pulse (CWP) generation circuit which outputs a CWP signal with a pulse width slightly narrower than an ON period of the gate signals Vga and Vgb. This forms the waveforms of the synchronous drive signals Vgs 1 and Vgs2 to the synchronous rectification MOSFETs (for example, refer to U.S. Pat. No. 7,184,280).

That is, when the operation frequency fop is the same as, or higher than, the resonant frequency fr1, the synchronous drive signals Vgs 1 and Vgs2 are synchronized with the gate signals Vga and Vgb, and when the operation frequency fop is lower than the resonant frequency fr1, the synchronous drive signals Vgs 1 and Vgs2 are synchronized with the constant width pulse signal CWP, therefore causing it to finish. Because of this, even in the case of replacing the secondary side rectification diodes D1 and D2 with the MOSFETs Qs1 and Qs2, which have a low on resistance, it is possible to prevent the reverse flow current from the secondary side.

However, with the arrangement described in U.S. Pat. No. 7,184,280, as a timing of a rise of the synchronous drive signals Vgs 1 and Vgs2 is always synchronized with the gate signals Vga and Vgb, it is difficult to prevent the reverse current immediately before the secondary current begins to flow, as in the reverse current area (Range B) in the second operational mode (Mode 2). Also, in the cases of Modes 4 to 6, in which the operation frequency fop is the same as, or higher than, the resonant frequency fr1, in the event that the synchronous drive signals Vgs 1 and Vgs2 are synchronized with the gate signals Vga and Vgb, it is not possible to prevent the reverse current under either the light load (LL) condition or very light load (VLL) condition.

As a different switching power supply device, a method which configures a synchronous rectification MOSFET control circuit, as shown in FIG. 27A, has been considered (for example, refer to U.S. Patent Application Publication No. 2008/0055942). Also, an operation waveform of a voltage or current of each portion thereof is shown in FIG. 27B.

This is a method which compares a drain-to-source voltage (Vds(on)) of a synchronous rectification switch element (MOSFET) with a reference voltage REF in a comparator 510, detects that the synchronous rectification MOSFET, or a body diode thereof, is conductive and, for a period during which the conductivity is detected and a gate signal Vgp is high (H), provides a signal causing the synchronous rectification MOSFET to be turned ON. That is, the method generates a comparison signal Vdsc, which is an output of the comparator 510, in an AND circuit 430, and an AND signal of the gate signal Vgp of the primary side main switch elements Qa and Qb, and outputs them as synchronous drive signals Vgs (that is, Vgs1 and Vgs2), of which the waveform has been formed, to the MOSFETs Qs1 and Qs2 (refer to FIG. 19), which are the synchronous rectification switch elements.

Generally, the drain-to-source voltage Vds of the MOSFET, in a condition in which the MOSFET is turned OFF and a current is flowing in the body diode, is equivalent to a body diode falling forward voltage $V_F$. Taking a source potential as a reference potential, the body diode falling forward voltage $V_F$ is exactly $-V_F$. Meanwhile, in the case in which the MOSFET is turned ON, the drain-to-source voltage is a product of the ON resistance of the MOSFET and the current flowing, and a value (an absolute value) thereof which is normally smaller than $V_F$.

The reference voltage REF connected to the comparator 510 firstly, by detecting that a current is flowing in the body diode, allows the synchronous rectification MOSFET to be turned ON, and subsequently, the MOSFET being turned ON, in order that it is possible to cause the synchronous rectification MOSFET to continue to be turned ON even when the drain-to-source voltage Vds is small, the absolute value of the reference voltage REF is made considerably small. Actually, taking noise and the like into consideration, it is necessary to make the absolute value large enough to be able to unfailingly detect that the synchronous rectification MOSFET, or the body diode thereof, is conductive.

However, as shown in FIG. 27B, when the secondary current Is decreases to zero, however small the value of the reference voltage REF is, at some point the product of the on resistance of the synchronous rectification MOSFET and the current flowing will become smaller. When this occurs, a condition is such that the comparison signal Vdsc inverts, the synchronous rectification MOSFET is turned OFF, and a current flows in the body diode, whereon the drain-to-source voltage Vds becomes $-V_F$. Because of this, the comparison signal Vdsc inverts again, and the synchronous rectification MOSFET is turned ON again, as a result of which the comparison signal Vdsc further inverts. Subsequently, as shown in the error area of FIG. 27B, the turning ON and OFF of the synchronous rectification MOSFET is repeated at a high frequency until the secondary current Is is definitely zero.

This oscillation phenomenon becomes more noticeable as the load LD becomes lighter, and the secondary current Is decreases. As such, as a high frequency oscillation is repeated without fail every time the secondary current Is decreases to zero. Accordingly, the arrangement described in U.S. Patent Application Publication No. 2008/0055942 is a method with a problem from the point of view of noise and power conversion efficiency.

As an invention which takes into consideration a conducting voltage of the body diode (internal diode), and sets a turn on threshold value ($V_{TH2}$), there is the one described in U.S. Patent Application Publication No. 2005/0122753. Herein, as a turn ON timing of the synchronous drive signal is decided only by the conducting voltage of the internal diode, there is a problem in that a malfunction is liable to occur in the dead time set in the primary side gate signals Vga and Vgb. Also, as a threshold value ($V_{TH1}$) which determines a turn OFF timing is a minute voltage value of around −20 mV, and what is more a negative value, there is a problem in that it is easily affected by noise, and the timing of the OFF operation is rendered unstable.

Also, with a different switching power source device, the primary side resonant current is detected with a current transformer, the exciting current is detected with a secondary side auxiliary coil, and a resonant current detection signal is compared with an exciting current detection signal. A synchronous rectification signal is generated based on a signal detecting whether or not a comparison result signal, a power switching signal, and the resonant current detection signal exceed 0A (for example, refer to JP-A-2005-198438).

With the technology of JP-A-2005-198438, it is possible to solve the reverse flow problem in each non-consecutive mode but, as the ON timing of the synchronous rectification MOSFETs is delayed in the operational modes (Modes 1 and 4) with the heavy load condition, the power efficiency decreases. Moreover, as the current transformer and auxiliary coil are used in the detection circuit, the circuit configuration becomes complex, and so on, it is difficult to design to an appropriate adjusted value, and it is not desirable from a point of view of cost either.

Furthermore, as a synchronous rectification circuit which may prevent the current from flowing in the reverse direction, and a power converter which attempts a reduction in power conversion loss, there is the arrangement described in JP-A-2005-198375. This arrangement compares a synchronous rectification transistor source-to-drain voltage in a comparator circuit and, when detecting a reverse direction current, attempts to prevent it using a switching unit. Herein, although a timing at which the synchronous rectification transistor is turned OFF is decided, there is no mention of a timing at which it is turned ON. Consequently, the arrangement is not effective as a measure for preventing the reverse flow of the current (Ranges B and D) in the second operational mode (Mode 2), third operational mode (Mode 3), fifth operational mode (Mode 5), and sixth operational mode (Mode 6). As such, with the heretofore known switching power source devices, there are none which includes a drive circuit that reliably prevents the reverse flow of the secondary current to the primary side in all of the six operational modes (refer to FIG. 20). For example, a method is also possible whereby, in the third operational mode (Mode 3) and sixth operational mode (Mode 6), the load condition is constantly detected and, when there is a change to the very light load condition, the reverse flow of the current (Ranges C and E) is prevented without turning ON the synchronous rectification MOSFETs. However, this kind of light load condition detection method has the following shortcomings.

One detection method has been to monitor an output signal of an error amplifier 1, and detect the condition of the load connected to the switching power source device. However, this method is not one which detects the load condition pulse by pulse ("pulse" herein means a switching pulse), that is, not one which detects the load condition every time a switching is carried out. Then, as there is a response delay in the error amplifier 1 itself, there inevitably occurs a time delay between a very light load condition actually starting and a condition detection signal to the effect that there is a very light load being emitted so, it not being possible to immediately stop the switching operation of the synchronous rectification MOSFETs. Accordingly, this method does not constitute a fundamental solution to the reverse flow problem. Further, the normal current resonant converter is of a design such as to reduce a frequency fluctuation due to a load fluctuation in a voltage-controlled oscillation circuit (VCO) 2. For this reason, a fluctuation in an error signal from the error amplifier 1 also decreases, it is difficult to reliably detect the load fluctuation, and moreover, it is readily affected by noise.

As another method, it is also possible to monitor the current flowing in the load with a resistor, and detect a light load condition.

However, a problem has occurred wherein not only is it impossible to avoid a reduction in power efficiency due to a power consumption occurring in the resistor provided on the secondary side, but also, depending on the circuit parameter design, the power efficiency decreases considerably by uniformly stopping the synchronous rectification when there is a very light load.

The invention having been contrived bearing in mind these kinds of point, an object thereof is to provide a switching power source device and switching power source control circuit which can reliably prevent a reverse flow of a current in any operational mode, and realize a stable synchronous rectification function, without worsening a power efficiency, at a time of a very light load too.

Further objects and advantages of the invention will be apparent from the following description of the invention.

SUMMARY OF THE INVENTION

In the invention, in order to solve the heretofore described problems, there is provided a switching power source device which, when an input direct voltage is applied to a series resonant circuit, generates a predetermined output voltage via a transformer, and supplies power to a load.

In the switching power source device, the series resonant circuit includes a current resonant inductor and a current resonant capacitor. Also, a plurality of main switch elements, configured of, for example, MOSFETs, switch a current path of the series resonant circuit by alternately turning ON and OFF. A transformer induces a current from the series resonant circuit to a secondary side by ON-OFF control of the main switch elements on a primary side. A plurality of synchronous rectification switch elements, in which internal diodes are connected in parallel, are each turned ON and OFF in response to one of the plurality of main switch elements, rectifying the secondary current of the transformer. A synchronous control circuit turns on the synchronous rectification switch element in synchronization with an ON timing of the main switching element corresponding to the synchronous rectification switch element, or with a conduction timing of the internal diodes detected by an inter-terminal voltage signal of the synchronous rectification switch element, whichever timing is later, and determines a maximum ON width of the synchronous rectification switch element in accordance with a delay time (Tdif) of the internal diode conduction timing with respect to the ON timing of the main switch element.

By this means, the switching power source device indicates a start timing of the maximum ON width of the synchronous rectification switch element in synchronization with the ON timing of the main switch element corresponding to the synchronous rectification switch element.

Also, the switching power source control circuit of the invention is a control circuit of a switching power source device including a series resonant circuit which includes a current resonant inductor and a current resonant capacitor, a plurality of main switch elements which switch a current path of the series resonant circuit by alternately turning on and off, a transformer which induces a current from the series resonant circuit to a secondary side by ON-OFF controlling the main switch elements on a primary side, and a plurality of synchronous rectification switch elements in which internal diodes are connected in parallel, and each is turned ON and OFF in response to one of the plurality of main switch elements, rectifying the secondary current of the transformer.

The switching power source control circuit includes a detection unit which detects a conduction timing of the internal diodes by an inter-terminal voltage signal of the synchronous rectification switch element, and a synchronous control circuit which turns ON the synchronous rectification switch element in synchronization with the conduction timing of the internal diodes of the synchronous rectification switch element detected by the detection unit, or with the ON timing of the main switch element corresponding to the synchronous rectification switch element, whichever timing is later, and decides a maximum ON width of the synchronous rectification switch element in accordance with a delay time of the conduction timing of the internal diodes with respect to the ON timing of the main switch element. The switching power source control circuit indicates a start timing of the maximum on width of the synchronous rectification switch element in synchronization with the ON timing of the main switch element corresponding to the synchronous rectification switch element.

According to the switching power source device and switching power source control circuit of the invention, as an ON-OFF control of a synchronous rectification switch element is executed, even when there is a very light load condition, by determining the size of the load using a plurality of reference time signals, it is possible to prevent the heretofore known reduction in power efficiency at a time of a very light load due to a stopping of a synchronous rectification. Also, it is possible to execute a simple synchronous rectification which can prevent a malfunction by preventing a current reverse flow in a light load condition, and stably detecting a drain-to-source voltage of a synchronous rectification MOSFET.

BRIEF DESCRIPTION OF THE DRAWINGS

FIGS. 3A-3H are timing diagrams illustrating a secondary side current control operation by the synchronous control circuit of FIG. 2;

FIGS. 8A-8H are timing diagrams illustrating a secondary side current control operation by the synchronous control circuit of FIG. 7;

FIGS. 10A-10I are timing diagrams illustrating a secondary side current control operation by the synchronous control circuit of FIG. 9;

FIGS. 12A-12K are timing diagrams illustrating a secondary side current control operation by the synchronous control circuit of FIG. 11;

FIG. 20 is a diagram illustrating a relationship between an operation frequency and a resonant frequency of six operational modes, and a load condition;

FIGS. 21A-21D are diagrams illustrating a secondary side current waveform induced via a transformer in a first operational mode;

FIGS. 22A-22D are diagrams illustrating a secondary side current waveform induced via a transformer in a second operational mode;

FIGS. 23A-23D are diagrams illustrating a secondary side current waveform induced via a transformer in a third operational mode;

FIGS. 24A-24D are diagrams illustrating a secondary side current waveform induced via a transformer in a fourth operational mode;

FIGS. 25A-25D are diagrams illustrating a secondary side current waveform induced via a transformer in a fifth operational mode;

FIGS. 26A-26D are diagrams illustrating a secondary side current waveform induced via a transformer in a sixth operational mode; and FIGS. 27A and 27B are diagrams for illustrating problem areas of heretofore known technology, wherein FIG. 27A is a diagram illustrating a control circuit of a synchronous rectification MOSFET, and FIG. 27B is an operation waveform diagram of each portion of the control circuit.

DETAILED DESCRIPTION OF PREFERRED EMBODIMENTS

Figure 1:
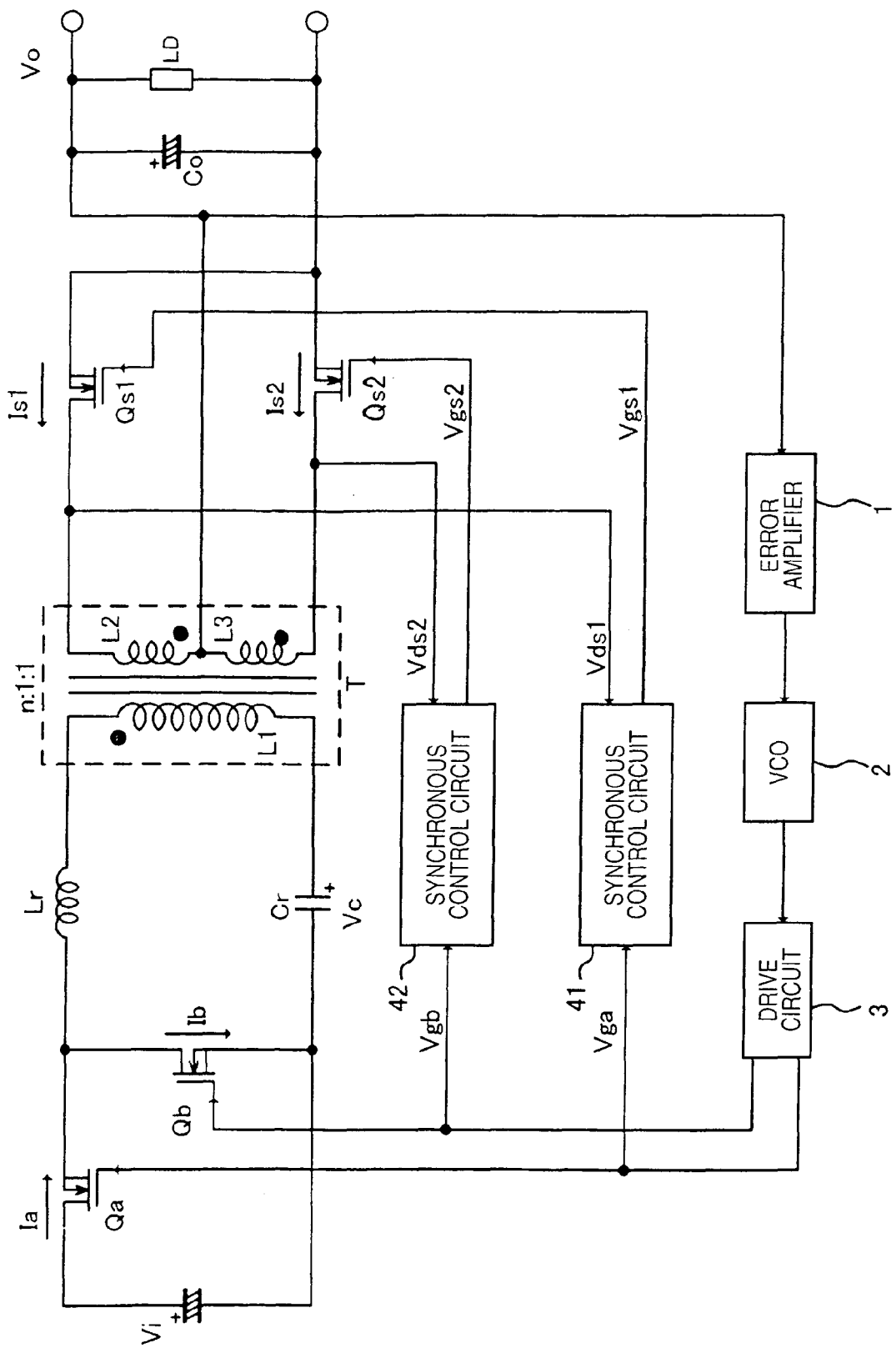
FIG. 1 is a circuit diagram illustrating an overall configuration of a switching power source device according to the invention.

Hereafter, a description will be given, referring to the drawings, of a switching power source device of the invention.

FIG. 1 is a circuit diagram illustrating an overall configuration of the switching power source device of the invention.

The switching power source device is configured in such a way that an input direct voltage Vi is applied to a series resonant circuit which includes a resonant inductor Lr and a resonant capacitor Cr, generating a predetermined output voltage $V_O$ on a load LD via a transformer T. MOSFETs Qa and Qb are main switch elements which, by switching alternately on a primary side of the transformer T, switch a current path to the series resonant circuit. One extremity of the resonant inductor Lr is connected to one extremity of a first coil L1 of the transformer T, while the other extremity of the first coil L1 is connected to one extremity of the resonant capacitor Cr. It is also acceptable, not providing any inductance other than the transformer T, to adopt a configuration wherein the transformer T has the current resonant inductor as leakage inductance. Also, it is also acceptable to provide external inductance other than the transformer T, and configure the current resonant inductor Lr as a combination of the external inductance and leakage inductance.

A second coil L2 and a third coil L3 are mutually connected in series on a secondary side of the transformer T, their connection point is connected to one extremity of an output capacitor $C_O$ and the load LD. Also, the other extremities of the second coil L2 and third coil L3 are connected to the other extremity of the ground side of the output capacitor $C_O$ and load LD via synchronous rectification MOSFETs Qs1 and Qs2 respectively.

Figure 2:
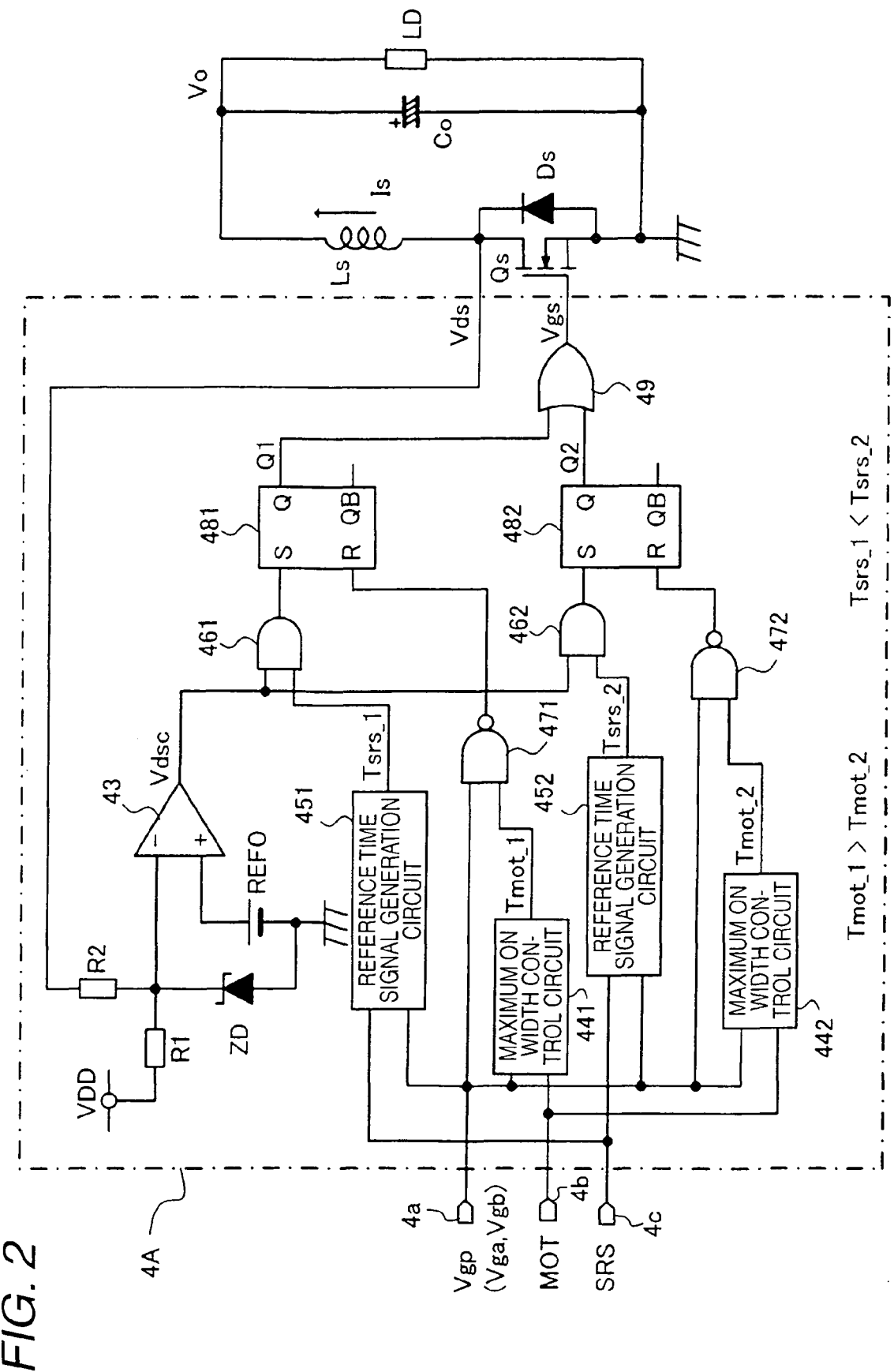
FIG. 2 is a circuit diagram illustrating a synchronous control circuit according to Embodiment 1.

The MOSFETs Qs1 and Qs2 are synchronous rectification switch elements which supply the predetermined output voltage $V_O$ to the load LD by turning ON and OFF secondary currents Is1 and Is2, induced from the transformer T, in response to ON-OFF operations of the primary side MOSFETs Qa and Qb, the kinds of internal diode (body diodes, or body diodes and external diodes) Ds shown in FIG. 2, to be described hereafter, are connected in parallel to each of them.

The output voltage $V_O$ supplied to the load LD is returned to a drive circuit 3 of the MOSFETs Qa and Qb via an error amplifier 1 and a voltage-controlled oscillation circuit (VCO) 2. The VCO 2 functions in such a way that, when determining that due to an output of the error amplifier 1 the output voltage $V_O$ is higher than a set voltage, or that the load LD is a light load, it increases an output frequency thereof, while when determining that the output voltage $V_O$ is lower than the set voltage, or that the load LD is a heavy load, it reduces the output frequency thereof. At this time, gate signals Vga and Vgb, which alternately turn ON and OFF at a predetermined timing, are generated in the drive circuit 3, and control in such a way as to send currents Ia and Ib of the MOSFETs Qa and Qb in the directions of the arrows at a predetermined timing. The gate signals Vga and Vgb generated in the drive circuit 3 are signals which, having a dead time between them of around 500 ns, are not ON simultaneously. It may happen, depending on the operating condition, that the current Ib flows in a direction opposite to that shown by the arrow.

Synchronous control circuits 41 and 42, into which the gate signals Vga and Vgb generated in the drive circuit 3 are respectively input, are provided in the switching power source device. The synchronous control circuits 41 and 42, as well as drain-to-source inter-terminal voltage signals Vds1 and Vds2 of the synchronous rectification MOSFETs Qs1 and Qs2 also are input therefrom, respectively output synchronous drive signals Vgs1 and Vgs2, which control an ON period of the MOSFETs Qs1 and Qs2. The synchronous drive signals Vgs1 and Vgs2, as will be described hereafter, turn ON the MOSFETs Qs1 and Qs2 respectively, in synchronization with a turn ON timing of the MOSFETs Qa and Qb, or a timing of a conduction of the internal diodes Ds (refer to FIG. 2 and the like of Embodiment 1, to be described hereafter) detected by the inter-terminal voltage signals Vds1 and Vds2 of the MOSFETs Qs1 and Qs2, whichever timing is later.

Furthermore, when turning on the synchronous rectification MOSFETs Qs1 and Qs2 with the synchronous control circuits 41 and 42, by comparing a delay time (Tdif) of the timing of the conduction of the internal diodes Ds from the turn-ON timing of the MOSFETs Qa and Qb with a reference time signal of a predetermined duration, determining the size of the load LD, the on period of the MOSFETs Qs1 and Qs2 is controlled so as to be of an optimum length. Consequently, with the switching power source device, not only are the current and voltage flowing into the first coil L1 of the transformer T appropriately controlled by the synchronous rectification MOSFETs Qs1 and Qs2, and the output voltage $V_0$ to the load LD on the secondary side controlled at a constant voltage, but also it is possible, as described hereafter, to reliably prevent a reverse current on the secondary side in any operational mode, without a blanket stoppage of the synchronous rectification at a time of a very light load.

It is acceptable that the reference time signal of the predetermined duration here is zero. Consequently, as shown in Embodiment 2 and the like, to be described hereafter, it is possible to make a maximum on width of the synchronous rectification switch elements variable depending on the delay time Tdif of the timing of the conduction of the internal diodes from the turn-on timing of the main switch elements.

Embodiment 1

Next, regarding the switching power source device according to Embodiment 1, a description will be given of a specific configuration of the synchronous control circuits 41 and 42 thereof.

FIG. 2 is a circuit diagram illustrating a synchronous control circuit according to Embodiment 1. Herein, as the configurations of the synchronous control circuits 41 and 42 of FIG. 1 are both the same, a synchronous control circuit 4A is shown as a representative configuration. Also, a synchronous rectification MOSFET Qs is a switch element which controls a secondary current Is of either the second coil L2 or third coil L3 (marked in FIG. 2 as Ls) on the secondary side of the transformer T. The internal diodes Ds are connected in parallel between its drain and source.

The synchronous control circuit 4A, is configured of two resistors R1 and R2, a Zener diode ZD, a comparator 43, first and second maximum ON width control circuits 441 and 442, first and second reference time signal generation circuits 451 and 452, and logic circuits such as AND circuits 461 and 462, NAND circuits 471 and 472, first and second flip-flop circuits 481 and 482, and an OR circuit 49, and generates a synchronous drive signal Vgs of the synchronous rectification MOSFET Qs. Herein, an inverting input terminal (−) of the comparator 43, as well as being grounded via the Zener diode ZD, is connected to a power source voltage VDD via the resistor R1, and furthermore is connected to a drain terminal of the synchronous rectification MOSFET Qs via the resistor R2. In the comparator 43, a reference voltage REF0 is applied to its non-inverting input terminal (+).

The first and second maximum ON width control circuits 441 and 442, and first and second reference time signal generation circuits 451 and 452, have almost the same configurations, as shown in each of the embodiments to be described hereafter. The circuits 441, 442, 451, and 452 are connected to a gate signal input terminal 4a, to which is supplied one of gate signals Vga and Vgb (hereafter marked simply as a gate signal Vgp) to the MOSFETs Qa and Qb, which correspond to the synchronous rectification MOSFET Qs shown in the diagram. Of these circuits, the maximum ON width control circuits 441 and 442 are each connected to an MOT terminal 4b. By connecting an external part such as a resistor or capacitor to the MOT terminal 4b, first and second maximum on width signals Tmot_1 and Tmot_2, wherein a maximum ON width size of a synchronous drive signal Vgs is adjusted in accordance with a resonant frequency fr1, are generated. In FIG. 2, the MOT terminal 4b is taken as a terminal common to the maximum on width control circuits 441 and 442. However, it is also acceptable to provide maximum ON width control circuits 441 and 442 with individual MOT terminals, so that the maximum on width is adjusted independently in each one. Also, the maximum ON widths of the first and second maximum on width signals Tmot_1 and Tmot_2 (the pulse widths at which the maximum on width signals Tmot_1 and Tmot_2 are H) are also expressed as Tmot_1 and Tmot_2. The same also applies to Tmot_3, Tmot_4, and so on up to Tmot_N, to be described hereafter.

Also, the reference time signal generation circuits 451 and 452, are circuits which generate a first reference time signal Tsrs_1, which forms a reference for a border between a light load condition and a very light load condition, and a second reference time signal Tsrs_2, which forms a reference for determining whether the condition is of a load so light that the synchronous rectification MOSFET Qs is not turned on, include an SRS terminal 4c, to which is connected an external part (a resistor, a capacitor, or the like) for setting the signal durations. In FIG. 2, the SRS terminal 4c is taken as a terminal common to the reference time signal generation circuits 451 and 452, but it is also acceptable to provide the reference time signal generation circuits 451 and 452 with individual SRS terminals, so that the reference duration is adjusted independently in each one. Also, the durations of each of the reference time signals Tsrs_1 and Tsrs_2 (the pulse width at which the relevant signal is H) are also expressed as Tsrs_1 and Tsrs_2. The same also applies to Tsrs_3, Tsrs_4, and so on up to Tsrs_N, to be described hereafter.

An output terminal of the first maximum on width control circuit 441 is connected to a reset terminal (R) of the first flip-flop circuit 481 via the NAND circuit 471, of which one extreme is connected to the gate signal input terminal 4a. Also, output terminals of the comparator 43 and first reference time signal generation circuit 451 are connected to a set terminal (S) of the first flip-flop circuit 481 via the AND circuit 461. In the same way, an output terminal of the second maximum on width control circuit 442 is connected to a reset terminal (R) of the second flip-flop circuit 482 via the NAND circuit 472, of which one extreme is connected to the gate signal input terminal 4a. Also, output terminals of the comparator 43 and second reference time signal generation circuit 452 are connected to a set terminal (S) of the second flip-flop circuit 482 via the AND circuit 462. Furthermore, the configuration is such that output signals Q1 and Q2, from the first and second flip-flop circuits 481 and 482 respectively, are input into the OR circuit 49, and a logical sum signal deriving from the output signals Q1 and Q2 is output from the OR circuit 49 as a gate signal (synchronous drive signal) Vgs to the synchronous rectification MOSFET Qs.

Next, a description will be given of an operation of the switching power source device according to Embodiment 1.

In the synchronous control circuit 4A of FIG. 2, the power source voltage VDD is taken to be A, and a MOSFET Qs drain-to-source voltage Vds (hereafter, this will be called a threshold value voltage Vds_th) when a level detection signal Vdsc, which is the output of the comparator 43, inverts is taken to be X. As the two inputs of the comparator 43 are equal when the drain-to-source voltage Vds is X, the following expression holds true. The above mentioned threshold value voltage Vds_th is different from a threshold value relating to an ON-OFF of the MOSFET Qs.

(A−X)*(R2/(R1+R2))+X=REF 0

∴ (A−X)+X*(1+R1/R2)=REF 0*(1+R1/R2)

∴ *(R1/R2)=(1+R1/R2)*REF 0−A

Consequently, the threshold value voltage Vds_th of the MOSFET Qs drain-to-source voltage Vds when the level detection signal Vdsc inverts is as shown in the following Expression (3).

$$Vds\_th = -VDD\frac{R2}{R1} + REF0\left(1 + \frac{R2}{R1}\right) \qquad (3)$$

When the drain-to-source voltage Vds exceeds the threshold value voltage Vds_th (strictly speaking, when both are negative values, and an absolute value of Vds is greater than an absolute value of the threshold value voltage Vds_th), the level detection signal Vdsc, which is the output of the comparator 43, inverts from L (low) to H. Incidentally, in a condition in which no current is flowing between the MOSFET Qs drain and source, or in the internal diodes Ds, the value of the drain-to-source voltage Vds is positive, and the level detection signal Vdsc is L. Also, in the condition in which the MOSFET Qs is OFF but a current is flowing in the internal diodes Ds, a falling forward voltage $V_F$ of the internal diodes Ds is applied as the MOSFET Qs drain-to-source voltage Vds and, as the threshold value voltage Vds_th is set to be lower than the falling forward voltage $V_F$, the level detection signal Vdsc is H. The level detection signal Vdsc of the drain-to-source voltage Vds is input into each of the AND circuits 461 and 462, and output signals of the AND circuits 461 and 462 are supplied to the flip-flop circuits 481 and 482 as set signals thereof. Also, output signals of the NAND circuits 471 and 472, into which the gate signal Vgp and maximum on width signals Tmot_1 and Tmot_2 are input, are supplied to the flip-flop circuits 481 and 482 as reset signals.

Herein, the two flip-flop circuits 481 and 482 are both reset prioritizing circuits. That is, when the gate signal Vgp of the main switch element is in the L condition before indicating the start of the maximum on width, it is not possible to set the flip-flop circuits 481 and 482, even in the event that the drain-to-source voltage Vds exceeds the threshold value voltage Vds_th. Because of this, it is possible to prevent a malfunction which may occur in a dead time set in the two primary side gate signals Vga and Vgb.

In the reference time signal generation circuits 451 and 452, every time the MOSFETs Qa and Qb are turned on, first and second reference time signals Tsrs_1 and Tsrs_2, which have mutually differing durations (herein, it is taken that Tsrs_1<Tsrs_2), are generated, forming discriminant criteria for an internal diode Ds conduction timing delay time Tdif (refer to each waveform of (A) and (C) of FIG. 3, to be described hereafter, and (H) in the same diagram) decided in accordance with the size of the load LD. Herein, utilizing the fact that the delay time Tdif is longer the lighter a load the load LD is, in the event that the delay time Tdif is equal to or longer than the duration of the first reference time signal Tsrs_1, it is determined whether or not to turn ON the synchronous rectification MOSFET Qs in synchronization with the timing with which the internal diodes Ds conduct, with the second reference time signal Tsrs_2, generated with a long duration, as a reference time. Also, after the MOSFET Qs is turned ON, the second maximum on width signal Tmot_2 which, of the two maximum on width signals Tmot_1 and Tmot_2 (herein, it is taken that Tmot_1>Tmot_2), instructs a finish at an earlier timing, becomes an actually used maximum ON width signal Tmot. That is, in the event that the MOSFET Qs does not go OFF until the second maximum ON width signal Tmot_2 finishes, the MOSFET Qs is turned OFF in synchronization with the timing of the second maximum on width signal Tmot_2 finishing.

Therein, when the internal diode Ds conduction timing delay time Tdif is longer than the duration specified by the first reference time signal Tsrs_1, it is determined that the electrically supplied load LD is in a very light load condition. As it does not happen, in this condition, that the output of the AND circuit 461 becomes H, the flip-flop circuit 481 is not set. However, in the event that the delay time Tdif is shorter than the duration specified by the second reference time signal Tsrs_2, the output of the AND circuit 462 becomes H, the flip-flop circuit 482 is set, a synchronous drive signal Vgs is output via the OR circuit 49 in accordance with an output signal Q2 of the flip-flop circuit 482, and it is possible to turn on the synchronous rectification MOSFET Qs. In the event that the delay time Tdif is longer than the duration specified by the second reference time signal Tsrs_2, it does not happen that the outputs of the AND circuits 461 and 462 become H, so the flip-flop circuits 481 and 482 are not set, and no synchronous drive signal Vgs is output.

In the maximum on width control circuits 441 and 442, the maximum on width signals Tmot_1 and Tmot_2 are generated which, as well as indicating a start timing of the maximum on width for the synchronous rectification MOSFET Qs in synchronization with an ON timing of the MOSFETs Qa and Qb, indicate a finish of the maximum ON width after a predetermined time longer than the duration of either of the reference time signals Tsrs_1 and Tsrs_2 in the reference time signal generation circuits 451 and 452. That is, the maximum ON width signals Tmot_1 and Tmot_2 are signals which, in synchronization with an ON timing of the MOSFET Qa or Qb, specify the maximum on width of ON signals to the synchronous rectification MOSFET Qs in accordance with the load and, in the event that this period is exceeded, indicate the finish of the maximum on width period by assuming a high value H (periods other than this are L (viz., a low value)), mandatorily turning OFF the MOSFET Qs. The start timing of the maximum ON width is the same as the timing at which the gate signals Vga and Vgb (that is, Vgp) to the MOSFETs Qa and Qb become H, and the MOSFETs Qa and Qb are turned ON.

As logical products (a negative thereof) of the gate signal Vgp and the maximum on width signals Tmot_1 and Tmot_2 taken in the NAND circuits 471 and 472 respectively, the flip-flop circuits 481 and 482 are reset at a timing at which the maximum ON width signals Tmot_1 and Tmot_2 become L, or a timing at which the gate signal Vgp, its on period finishing, becomes L, whichever timing is earlier.

Consequently, in the event that the delay time Tdif is in a very light load condition in which it becomes longer than the duration specified by the first reference time signal Tsrs_1, and also, the delay time Tdif is shorter than the duration specified by the second reference time signal Tsrs_2 (Tsrs_1<Tdif<Tsrs_2), it is possible to decide the timing at which the MOSFET Qs is turned ON in the synchronous control circuit 4A in synchronization with the start timing of the maximum ON width. That is to say, the timing at which the gate signal Vgp changes from L to H, the maximum ON width signal Tmot_2 changes from L to H, and the reset of the flip-flop circuit 482 is released), or with the internal diode Ds conduction timing detected by the MOSFET Qs drain-to-source voltage Vds, whichever timing is later. Also, regarding the timing at which the MOSFET Qs is turned OFF too, it is decided in synchronization with the maximum ON width signal Tmot_2 indicating the finish of the maximum ON width, or with the OFF timing of the MOSFETs Qa and Qb, whichever timing is earlier.

Also, with the delay time Tdif in a very light load condition, close to a no-load condition, in which it is longer than the duration specified by the second reference time signal Tsrs_2 (Tdif>Tsrs_2), as the flip-flop circuits 481 and 482 are not set in the way heretofore described, it does not happen that the gate signal Vgp becomes H, and a control which does not turn ON the MOSFET Qs is carried out.

Regarding the maximum ON width control circuits 441 and 442, and the reference time signal generation circuits 451 and 452, they can be configured of one-shot multivibrators which, by being triggered by the rise of a gate signal Vgp, adjust the maximum on widths of the respectively output maximum on width signals Tmot_1 and Tmot_2, and the durations of the reference time signals Tsrs_1 and Tsrs_2, using the external part connected to the MOT terminal 4b or SRS terminal 4c. However, the one-shot multivibrator itself being commonly known, any further description relating to this will be omitted.

FIG. 3 is a timing diagram illustrating a secondary side current control operation by the synchronous control circuit of FIG. 2. That is, it is a timing diagram in a case in which the maximum ON width control circuits 441 and 442, and reference time signal generation circuits 451 and 452, are configured of one-shot multivibrators.

In A of FIG. 3, the gate signal Vgp from the drive circuit 3 shown in FIG. 1 is shown for six operational modes, Modes 1 to 6, lined along the same time axis. B of FIG. 3 shows the secondary current Is flowing in the synchronous rectification MOSFET Qs. The secondary current Is is compared with an absolute value (|Vds_th|) of the threshold value voltage when the level detection signal Vdsc inverts converted into a current by dividing by an ON resistance Ron of the MOSFET Qs. The threshold value voltage Vds_th can be calculated using the heretofore described Expression (3). Alternatively, it is possible to decide the voltage Vds_th first, and adjust other parameters using the Expression (3).

In C of FIG. 3, a waveform of the level detection signal Vdsc is shown. The |Vds_th|/Ron shown in B of FIG. 3 shows a level of the secondary current Is for which the level detection signal Vdsc output from the comparator 43 is H. Also, the maximum ON width signals Tmot_1 and Tmot_2 are shown in D and E of FIG. 3, the reference time signals Tsrs_1 and Tsrs_2 in F and G of FIG. 3, and the synchronous drive signal Vgs output from the synchronous control circuit 4A in H of FIG. 3. Also, in the operational modes Modes 2 and 3, and Modes 5 and 6, the internal diode Ds conduction timing delay time Tdif occurring with respect to the ON timing of the MOSFETs Qa and Qb, is shown. Herein, in the operational modes Mode 2 and Mode 5, Tdif<Tsrs_1, while in the operational mode Mode 3, Tsrs_1<Tdif<Tsrs_2. Also, in the operational mode Mode 6, as the delay time Tdif exceeds the duration of the reference time signal Tsrs_2 set in the reference time signal generation circuit 452, the synchronous drive signal Vgs from the synchronous control circuit 4A stops.

Regarding the level detection signal Vdsc of C of FIG. 3, as is clear from the description immediately following the Expression (3), pulsed signals generated at a first and last timing of an oscillatory waveform of the secondary current Is shown in B of FIG. 3 in Modes 1, 2, 3, 4, and 5, and a rectangular wave in Mode 6, all occur in a condition in which the MOSFET Qs is off, and a current is flowing in the internal diodes Ds.

That is, in the third and sixth operational modes (Modes 3 and 6), in which the delay time Tdif exceeds the duration of the reference time signal Tsrs_1 of the reference time signal generation circuit 451, a very light load condition of the load LD is detected. However, the synchronous drive signal Vgs is output only in the third operational mode Mode 3, in which Tdif<Tsrs_2, while no synchronous drive signal Vgs is output from the synchronous control circuit 4A in the sixth operational mode Mode 6, in which Tdif>Tsrs_2. That Tsrs_1<Tdif<Tsrs_2 in Mode 3, and Tdif>Tsrs_2 in Mode 6, being one example, the synchronous drive signal Vgs is output based on the maximum ON width signal Tmot_2 and gate signal Vgp when Tsrs_1<Tdif<Tsrs_2, and no synchronous drive signal Vgs is output when Tdif>Tsrs_2, in any operational mode. In the event that Tsrs_1<Tdif<Tsrs_2, and the synchronous drive signal Vgs is output, it is sufficient to make the duration of the maximum on width signal Tmot_2 of a value such that no reverse flow occurs in a load region in which Tsrs_1<Tdif<Tsrs_2. Consequently, even when there is a very light load condition, there is no need for a blanket turning off of the MOSFET Qs, and moreover, it is also possible to reliably prevent a reverse flow of the secondary current Is in a Range C (FIG. 23) or a Range E (FIG. 26) which has heretofore occurred.

Also, in the first operational mode (Mode 1), the synchronous drive signal Vgs turns off the MOSFET Qs in synchronization with a timing at which the gate signal Vgp is turned OFF, or a timing at which the first maximum on width signal Tmot_1 indicates a turning OFF, whichever timing is earlier. For this reason, it is possible to reliably prevent a reverse flow of the secondary current Is in a Range A (FIG. 21), which has heretofore occurred at a timing of a latter half of a half cycle (Top/2) of the switching operation.

Furthermore, in the second and fifth operational modes (Modes 2 and 5), the synchronous drive signal Vgs turning ON the MOSFET Qs in synchronization with a timing at which the first maximum ON width signal Tmot_1 indicates a turning on, or with an internal diode Ds conduction timing detected by the level detection signal Vdsc of the drain-to-source voltage Vds, whichever timing is later, it is also possible to reliably prevent a reverse current in a Range B (FIG. 22) or a Range D (FIG. 25), which has heretofore occurred in a first half of the half cycle (Top/2) of the switching operation. Also, once the MOSFET Qs has been turned on, a fluctuation of the drain-to-source voltage Vds is ignored. Consequently, there is no occurrence of the phenomenon seen in the configuration of U.S. Patent Application Publication No. 2008/0055942 wherein a high frequency oscillation is invariably repeated every time the secondary current Is decreases to zero.

Figure 4A:
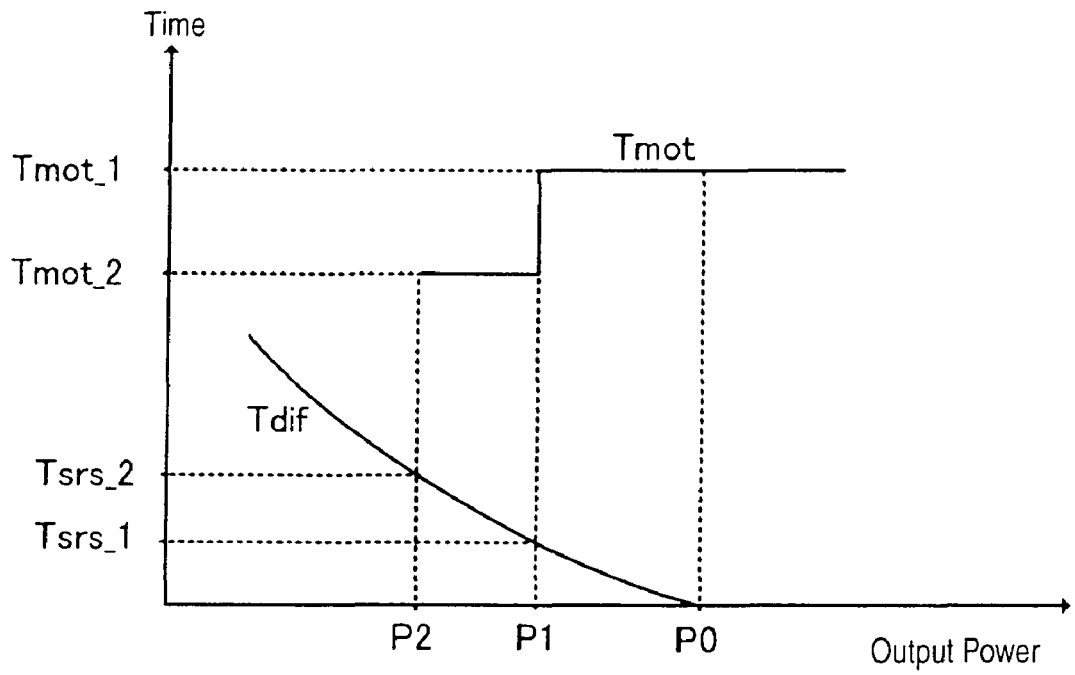
FIGS. 4A and 4B are graphs illustrating a relationship between an internal diode conduction timing delay time and an output power.
Figure 4B:
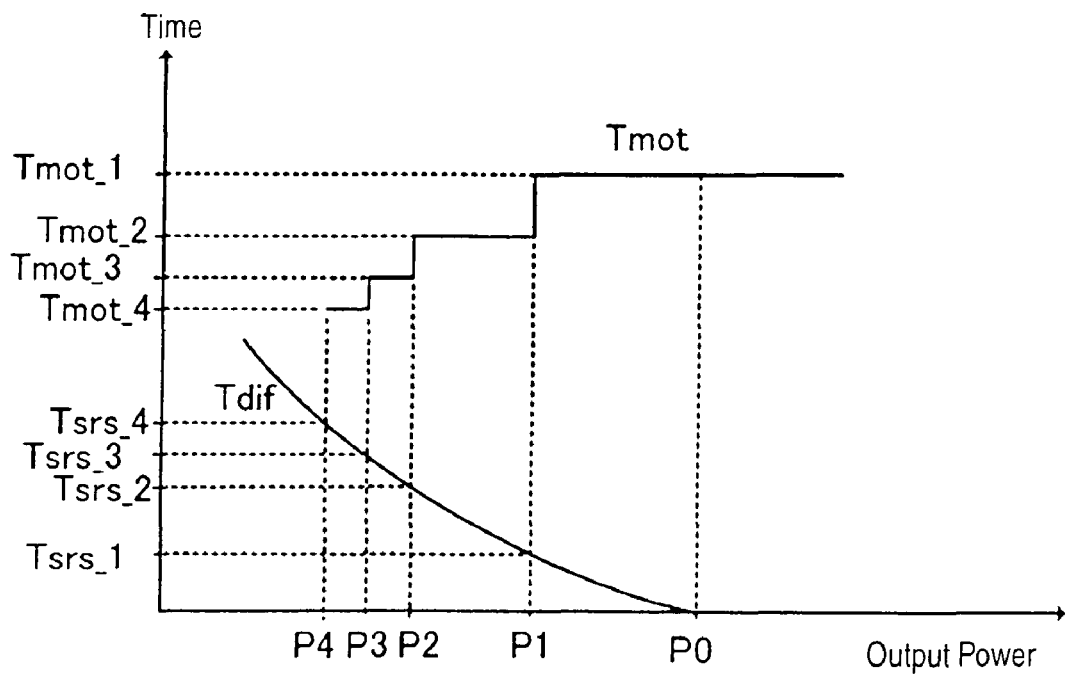

FIGS. 4A and 4B are graphs illustrating a relationship between the internal diode Ds conduction timing delay time Tdif and an output power.

FIG. 4A, relates to a case in which two kinds of mutually differing reference time signal Tsrs_1 and Tsrs_2 (Tsrs_1<Tsrs_2) are set as reference time signals determining a very light load condition, a time axis is expressed on the vertical axis, and the output power at that time is shown on the horizontal axis. In the event that the internal diode Ds conduction timing delay time Tdif is equal to or less than the duration of the reference time signal Tsrs_1, a power equal to or greater than P1 (<P0) is output to the load LD by the maximum ON width of the synchronous drive signal Vgs being specified by the first maximum ON width signal Tmot_1. P0 indicates a power to a load which has a size on the border between a load with which the delay time Tdif is zero and a load with which it is nonzero. Also, in a case too in which the delay time Tdif becomes equal to or greater than the duration of the reference time signal Tsrs_1, and it is determined that there is a very light load condition, provided that the delay time Tdif is shorter than the duration specified by the second reference time signal Tsrs_2, the synchronous drive signal Vgs is output to the MOSFET Qs, as well as which it is possible to regulate its maximum ON width with the second maximum ON width signal Tmot_2. Consequently, the output power to the load LD at that time being in a range of P1 to P2 (<P1), it is possible to prevent a reverse flow of the secondary side current, without a blanket stopping of the synchronous rectification in the MOSFET Qs. When the delay time Tdif becomes equal to or greater than the duration of the reference time signal Tsrs_2, and the synchronous drive signal Vgs ceases to be output, the secondary current Is is supplied via the internal diodes Ds. In this case, there existing a very light load condition, close to a no-load condition, the secondary current Is flowing there is a minimal one, so a loss due to the internal diodes Ds is modest. Also, as it is supplied via the internal diodes Ds, no reverse flow to the transformer T side occurs.

FIG. 4B illustrates the relationship between the delay time Tdif and the output power in a case in which the third and fourth reference time signals Tsrs_3 and Tsrs_4 (Tsrs_3<Tsrs_4) with longer durations are set. Herein, in the event that it is determined that the load LD is in a very light load condition, a plurality of maximum ON widths are provided, compartmentalizing the very light load condition. That is, they are a maximum ON width for the range of P1 to P2 (<P1), a maximum ON width for a range of P2 to P3 (<P2), and a maximum ON width for a range of P3 to P4 (<P3). For this, it is sufficient to provide a maximum ON width control circuit and reference time signal generation circuit in addition to the heretofore described synchronous control circuit 4A, and cause the third and fourth reference time signals Tsrs_3 and Tsrs_4, and the third and fourth maximum ON width signals Tmot_3 and Tmot_4 (Tmot_3>Tmot_4) corresponding thereto, to be emitted. In this way, by more narrowly compartmentalizing the very light load condition, a further improvement in power efficiency is possible. Also, when the delay time Tdif becomes equal to or greater than the duration of the reference time signal Tsrs_4, the synchronous drive signal Vgs ceases to be output. As shown in FIG. 4B, regarding the maximum ON width signal Tmot_4 corresponding to the maximum reference time signal Tsrs_4, it is necessary to set its maximum ON width to be longer than the duration of the reference time signal Tsrs_4.

Generally, in a case of providing N reference time signals and maximum ON width signals, it is sufficient to configure the switching power source device as follows. That is, N reference time signal generation circuits respectively generating N reference time signals Tsrs_1, Tsrs_2, and so on up to Tsrs_N, which have a relationship such that each duration is Tsrs_i<Tsrs_i+1, and N maximum ON width control circuits generating N maximum ON width signals Tmot_1, Tmot_2, and so on up to Tmot_N (indicating a start and finish of these signals), which have a relationship such that each duration is Tmot_i>Tmot_i+1, are provided. Herein, i being a natural number 1 to (N−1), N is taken to be an integer of 3 or greater. Then, in the event that the delay time (Tdif) is between the duration of Tsrs_i and the duration of Tsrs_i+1, among the reference time signal durations Tsrs_1, Tsrs_2, and so on up to Tsrs_N, the synchronous rectification MOSFET Qs is turned ON in synchronization with the internal diode Ds conduction timing, and also, the synchronous rectification MOSFET Qs is turned off in synchronization with the finish timing of the maximum ON width signal Tmot_i+1, or with the turning OFF timing of the MOSFETs Qa and Qb, which are the main switch elements, whichever timing is earlier. Also, in the event that the delay time (Tdif) is longer than the maximum reference time signal Tsrs_N, no synchronous drive signal Vgs is output.

The very light load condition has been defined as a case in which the load LD actually connected is 20% or less of a rated load (maximum load) of the switching power source device, but the setting of this ratio can be changed as appropriate. In order to do this, it is sufficient to adjust the duration of the first reference time signal Tsrs_1 with, for example, an external resistor.

Embodiment 2

Next, a description will be given of a synchronous control circuit which, when ON-OFF controlling the synchronous rectification switch element Qs, changes the maximum ON width of a synchronous drive signal with a single maximum ON width control circuit. Firstly, an example will be given of a discontinuous variable control of the maximum ON width using a discontinuous current control.

Figure 5:
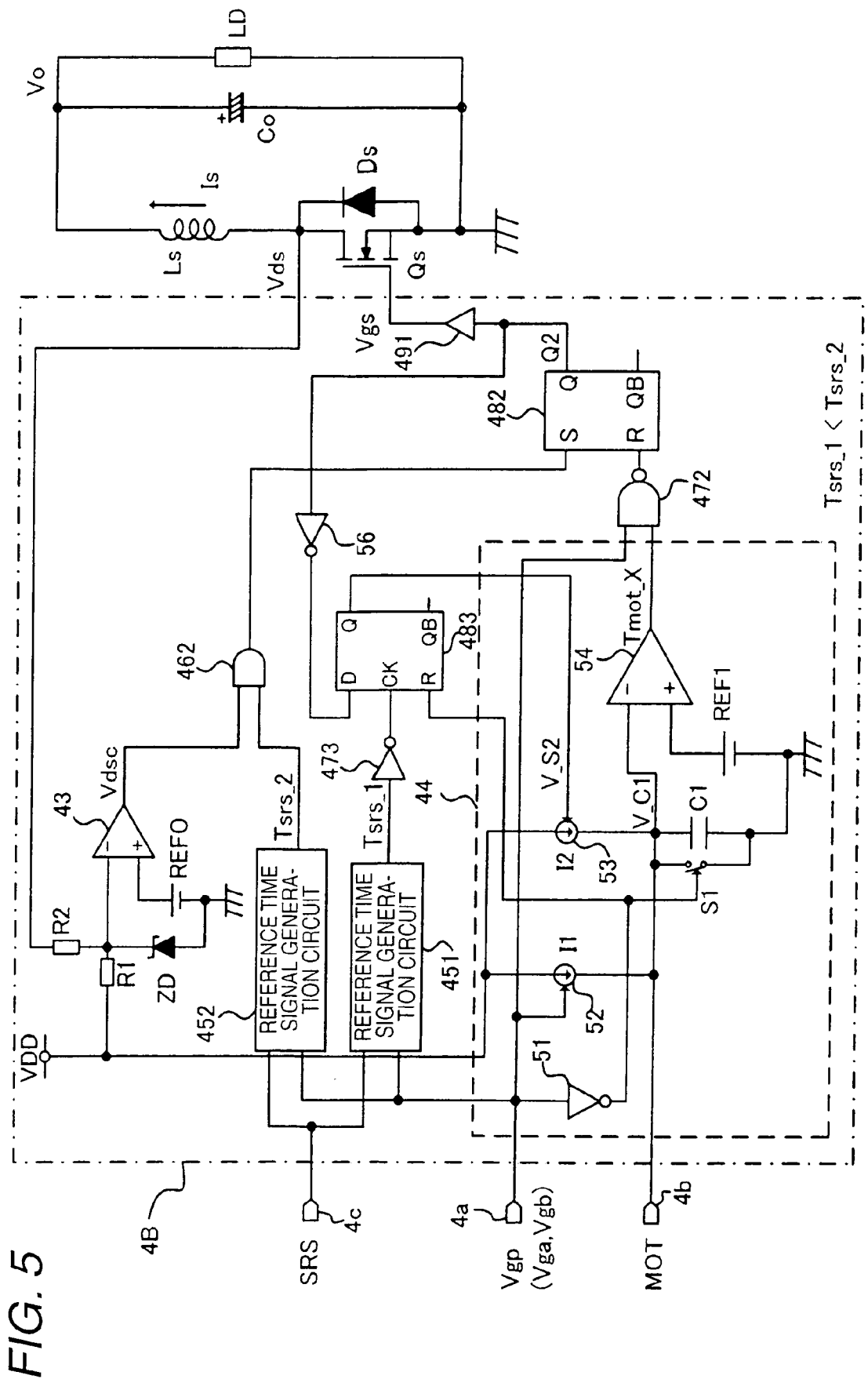
FIG. 5 is a circuit diagram illustrating a synchronous control circuit according to Embodiment 2.
Figure 6A:
FIGS. 6A-6H are timing diagrams illustrating a secondary side current control operation by the synchronous control circuit of FIG. 5.
Figure 6B:
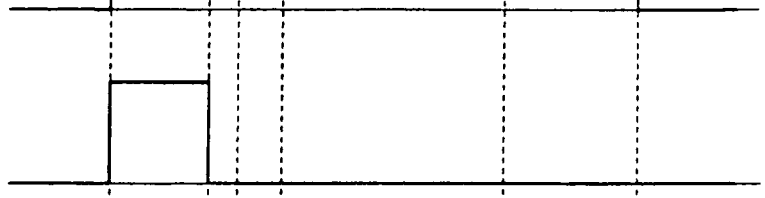
Figure 6C:
Figure 6D:
Figure 6E:
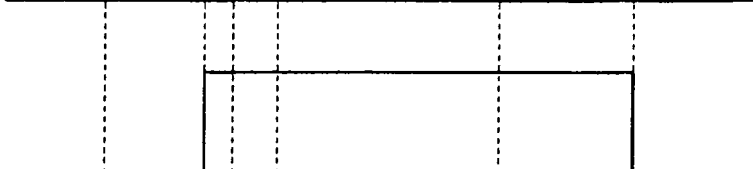
Figure 6F:
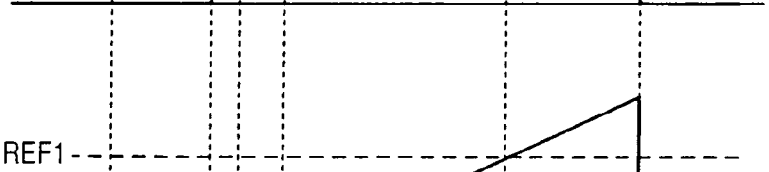
Figure 6G:
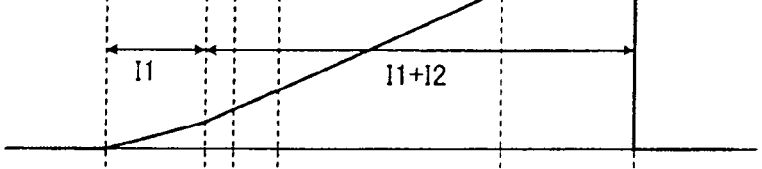
Figure 6H:
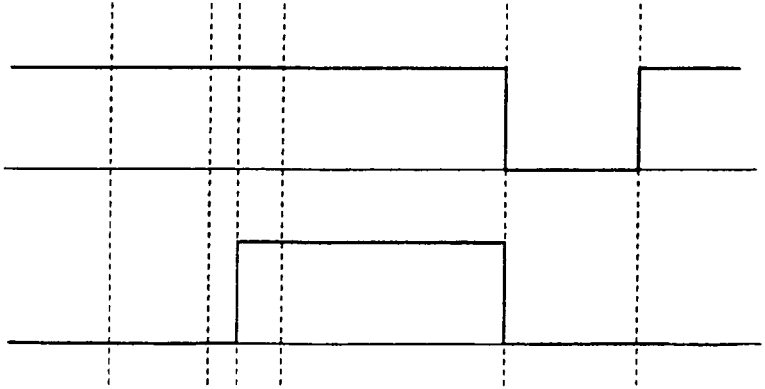

FIG. 5 is a circuit diagram illustrating a synchronous control circuit according to Embodiment 2.

Herein too, a synchronous control circuit 4B is shown as a representative of the synchronous control circuits 41 and 42 of FIG. 1. Also, a synchronous rectification MOSFET Qs being a switch element which controls a secondary current Is of either the second coil L2 or third coil L3 on the secondary side of the transformer T, the internal diodes Ds are connected in parallel between its drain and source.

The synchronous control circuit 4B, is configured of two resistors R1 and R2, a Zener diode ZD, a comparator 43, first and second reference time signal generation circuits 451 and 452, a maximum ON width control circuit 44, and logic circuits such as an AND circuit 462, a NAND circuit 472, second and third flip-flop circuits 482 and 483, and inverters 473 and 56, and outputs a synchronous drive signal Vgs to the synchronous rectification MOSFET Qs via a buffer circuit 491.

The synchronous control circuit 4B of Embodiment 2 differs greatly from that of FIG. 2 in that it includes only the single maximum ON width control circuit 44. Hereafter, in giving a specific description of a configuration of the maximum ON width control circuit 44, and of a peripheral circuit thereof, identical reference characters and numerals will be given to portions corresponding to those of the synchronous control circuit 4A of FIG. 2, and a description thereof will be omitted.

The maximum ON width control circuit 44, as shown in FIG. 5, is configured of an inverter 51 connected to a gate signal input terminal 4a, constant current sources 52 and 53 connected to a power source voltage VDD, a capacitor C1, of which one extremity is connected to the constant current sources 52 and 53 and the other extremity is grounded, a switch S1, which controls a charge and discharge of a charging voltage V_C1 of the capacitor C1, and a comparator 54, which compares the charging voltage V_C1 of the capacitor C1 with a reference voltage REF1, and outputs a maximum ON width finish signal Tmot_X. One input terminal of the NAND circuit 472 is connected to the gate signal input terminal 4a, the other input terminal is connected to the output terminal of the comparator 54, and furthermore, the output terminal is connected to a reset terminal (R) of the flip-flop circuit 482. Herein, as a logical product (a negative thereof) of the gate signal Vgp and maximum ON width finish signal Tmot_X is taken in the NAND circuit 472, the flip-flop circuit 482 is reset at a timing at which the maximum ON width finish signal Tmot_X becomes L, or a timing at which the gate signal Vgp, its on period finishing, becomes L, whichever timing is earlier.

The reference time signal generation circuits 451 and 452, are circuits which generate a first reference time signal Tsrs_1, which forms a reference for a border between a light load condition and a very light load condition, and a second reference time signal Tsrs_2, which forms a reference for determining whether the condition is of a load so light that the synchronous rectification MOSFET Qs is not turned on, include an SRS terminal 4c, to which is connected an external part (a resistor, a capacitor, or the like) for setting the signal durations. In the reference time signal generation circuits 451 and 452, every time the MOSFETs Qa and Qb are turned on, first and second reference time signals Tsrs_1 and Tsrs_2, which have mutually differing durations (herein, it is taken that Tsrs_1<Tsrs_2) are generated, forming discriminant criteria for an internal diode Ds conduction timing delay time Tdif decided in accordance with the size of the load LD.

An MOT terminal 4b, by a resistor, a capacitor, or the like being connected thereto, can adjust an output timing of the maximum ON width finish signal Tmot_X output from the comparator 54 in accordance with a resonant frequency fr1. In the event of connecting a resistor, a current from the constant current sources 52 and 53 is split by the resistor, and it is possible to delay the output timing of the maximum ON width finish signal Tmot_X in accordance with the resistance value of the resistor. In FIG. 5, arrows linking with the constant current sources 52 and 53 from a horizontal direction representing an input of a control signal into the constant current sources 52 and 53, the constant current sources 52 and 53 output a constant current when the relevant control signal (Vgp or VS_2) is H, and stop the supply of the constant current when it is L. Also, in the event of connecting a capacitor to the MOT terminal 4b, it being equivalent to a capacity value of the capacitor C1 increasing, it is possible by this means to delay the output timing of the maximum ON width finish signal Tmot_X.

In the third flip-flop circuit 483, the reference time signal Tsrs_1 is input from the first reference time signal generation circuit 451 into a clock terminal CK, via the inverter 473, in an inverted condition. Also, an output signal Q2 of the second flip-flop circuit 482 being supplied via the inverter 56 to a D input terminal of the flip-flop circuit 483, the condition of the synchronous drive signal Vgs of the synchronous rectification MOSFET Qs is loaded. Furthermore, a reset terminal (R) of the third flip-flop circuit 483, being connected to the gate signal input terminal 4a via the inverter 51, is configured so as to be reset by the gate signal Vgp of the main switch element. In this way, the control signal V_S2 for turning ON and OFF the current output of the constant current source 53 is output from the third flip-flop circuit 483.

Next, a description will be given of an operation of the switching power source device according to Embodiment 2.

FIG. 6 is a timing diagram illustrating a secondary side current control operation by the synchronous control circuit of FIG. 5. A of FIG. 6 illustrates the gate signal Vgp from the drive circuit 3 shown in FIG. 1. Also, B and C of FIG. 6 illustrate the first and second reference time signals Tsrs_1 and Tsrs_2. Also, D of FIG. 6 illustrates a waveform of the level detection signal Vdsc. Furthermore, E of FIG. 6 illustrates the control signal V_S2 of the constant current source 53, F of FIG. 6 the charging voltage V_C1 of the capacitor C1, and G and H of FIG. 6 illustrate the maximum ON width finish signal Tmot_X and synchronous drive signal Vgs respectively.

A charging current I1 flows into the capacitor C1 from the constant current source 52 at a gate signal Vgp rise timing t1, and its charging voltage V_C1 begins to rise. Subsequently, by the third flip-flop circuit 483 reading the condition of the synchronous drive signal Vgs at a reference time signal Tsrs_1 fall timing t2, the ON-OFF condition of the other constant current source 53 is decided by the control signal V_S2.

As the synchronous drive signal Vgs is still L at the reference time signal Tsrs_1 fall timing t2 in the event that the load LD is a very light load, on a clock being input into the third flip-flop circuit 483 at the time t2, the control signal V_S2, which is the output of the third flip-flop circuit 483, becomes H. In the synchronous control circuit 4B of FIG. 5, on the control signal V_S2 becoming H at the time t2, as shown in FIG. 6, the charging current I1 of the maximum ON width control circuit 44 capacitor C1 increases to a charging current I1+I2, and a time (t1 to t5) until the charging voltage V_C1 shown in F of FIG. 6 reaches the reference voltage REF1 of the comparator 54 is reduced. However, in the event that it is determined by the level detection signal Vdsc that the load LD is large, the control signal V_S2, which is the output of the third flip-flop circuit 483, remains at L even after the time t2 has passed, and the capacitor C1 is charged only by the charging current I1 until the end, meaning that the time until the charging voltage V_C1 reaches the reference voltage REF1 becomes longer. That is, the fall timing of the maximum ON width finish signal Tmot_X output from the maximum ON width control circuit 44 is decided by the condition of the synchronous drive signal Vgs at the reference time signal Tsrs_1 fall point t2. Consequently, the maximum ON width of the maximum ON width control circuit 44 maximum ON width finish signal Tmot_X is switched between two levels in accordance with the synchronous rectification MOSFET Qs conduction timing delay time Tdif.

That is, in the event that the load LD is in a very light load condition, the synchronous drive signal Vgs at the reference time signal Tsrs_1 fall being L, the capacitor C1 is charged by the charging current I1 while the reference time signal Tsrs_1 is H (t1 to t2), and is charged by the charging current I1+I2 from the timing t2 at which the reference time signal Tsrs_1 becomes L. Consequently, the charging speed of the capacitor C1 increases, and a maximum ON width finish signal Tmot_X with a short maximum ON width is output.

Conversely, in the event that the load LD is not in a very light load condition, the synchronous drive signal Vgs at the reference time signal Tsrs_1 fall is H, meaning that the capacitor C1 is charged only by the charging current I1, even after the reference time signal Tsrs_1 becomes L. Consequently, the maximum ON width of the maximum ON width finish signal Tmot_X increases.

Embodiment 3

Next, a description will be given of a synchronous control circuit having a maximum ON width control circuit configured in such a way as to change the capacity value of a capacitor at a time of a discontinuous variable control of the maximum ON width.

Figure 7:
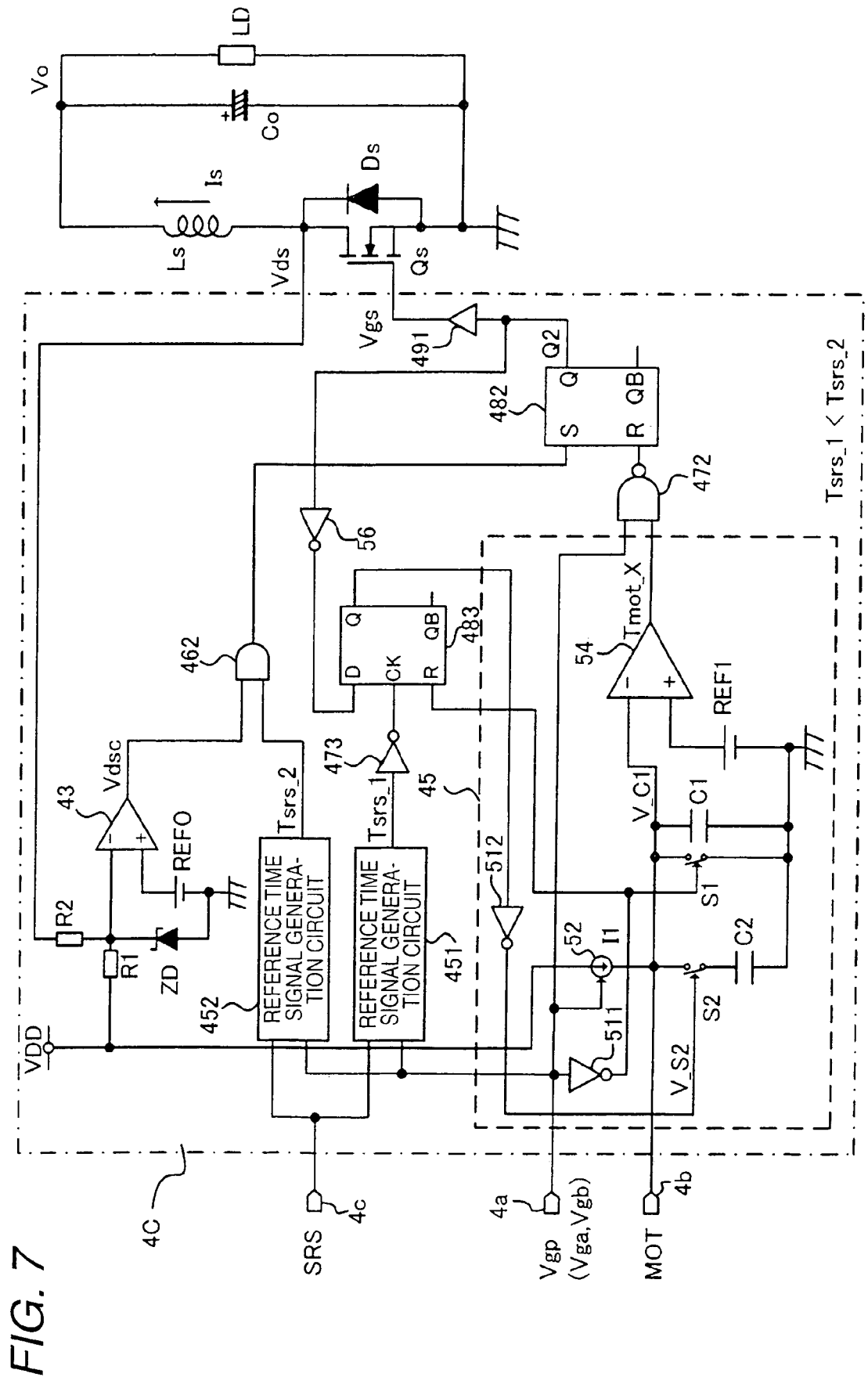
FIG. 7 is a circuit diagram illustrating a synchronous control circuit according to Embodiment 3.

FIG. 7 is a circuit diagram illustrating a synchronous control circuit according to Embodiment 3.

Herein too, a synchronous control circuit 4C is shown as a representative of the synchronous control circuits 41 and 42 of FIG. 1. The synchronous control circuit 4C, being configured of two resistors R1 and R2, a Zener diode ZD, a comparator 43, first and second reference time signal generation circuits 451 and 452, a maximum ON width control circuit 45, and logic circuits such as an AND circuit 462, a NAND circuit 472, second and third flip-flop circuits 482 and 483, and inverters 473 and 56, outputs a synchronous drive signal Vgs to the synchronous rectification MOSFET Qs via a buffer circuit 491. As the synchronous control circuit 4C is the same as the heretofore described configuration of the synchronous control circuit 4B of Embodiment 2 with the exception of the maximum ON width control circuit 45, hereafter, in giving a specific description of a configuration of the maximum ON width control circuit 45, identical reference characters and numerals will be given to portions corresponding to those of the synchronous control circuit 4B of FIG. 5, and a description thereof will be omitted.

In the synchronous control circuit 4C of Embodiment 3, the maximum ON width control circuit 45, unlike the maximum ON width control circuit 44 of FIG. 5, includes one constant current source 52, and two capacitors C1 and C2 connected in parallel. The constant current source 52, which is connected to a power source voltage VDD, is connected to a gate signal input terminal 4a, and a gate signal Vgp from the drive circuit 3 shown in FIG. 1 is supplied as a control signal. When the gate signal Vgp is H, the constant current source 52 can supply a constant current I1 to the two capacitors C1 and C2 connected in parallel.

A switch S1 is connected in parallel with the capacitor C1 so as to short circuit the two extremities. The switch S1 being one which controls a charge and discharge of a charging voltage V_C1 of the capacitor C1, the switch S1 is turned OFF by an output of an inverter 51 connected to the gate signal input terminal 4a when the gate signal Vgp becomes H, and the capacitor C1 is charged by the current I1 from the constant current source 52. Also, a switch S2 being provided in series with the capacitor C2, a control signal V_S2, which turns the switch S2 ON and off, is supplied from an output terminal Q of the third flip-flop circuit 483 via an inverter 512. Then, in the comparator 54, the charging voltage V_C1 of the capacitor C1, which is one input, is compared with a reference voltage REF1 and, at the point at which it exceeds the reference voltage REF1, a maximum ON width finish signal Tmot_X is output, inverted from H to L.

FIG. 8 is a timing diagram illustrating a secondary side current control operation by the synchronous control circuit of FIG. 7. A of FIG. 8 illustrates the gate signal Vgp from the drive circuit 3 shown in FIG. 1. Also, B and C of FIG. 8 illustrate the first and second reference time signals Tsrs_1 and Tsrs_2. Also, D of FIG. 8 illustrates a waveform of the level detection signal Vdsc. Furthermore, E of FIG. 8 illustrates the control signal V_S2 of the switch S2, F of FIG. 8 the charging voltage V_C1 of the capacitor C1, and G and H of FIG. 8 illustrate the maximum ON width finish signal Tmot_X and synchronous drive signal Vgs respectively.

The charging current I1 flows into the capacitors C1 and C2 from the constant current 52 at a gate signal Vgp rise timing t1, and their charging voltage V_C1 begins to rise. Subsequently, by the third flip-flop circuit 483 reading the condition of the synchronous drive signal Vgs at a reference time signal Tsrs_1 fall timing t2, the control signal V_S2 which controls the ON-OFF condition of the switch S2, is decided.

As the synchronous drive signal Vgs is still L at the reference time signal Tsrs_1 fall timing t2 in the event that the load LD is a very light load, on a clock being input into the third flip-flop circuit 483 at the time t2, the control signal V_S2, which is the output of the third flip-flop circuit 483, becomes H.

FIG. 8 illustrates a case in which the load LD is in a very light load condition, the charging current I1 flows in such a way as to charge the two capacitors C1 and C2, while the reference time signal Tsrs_1 is H (t1 to t2). However, from the timing t2 at which the reference time signal Tsrs_1 becomes L, the capacitor C2 being cut off by the switch S2 being turned off, only the capacitor C1 is charged by the charging current I1. Consequently, the charging speed of the capacitor C1 increases, and a maximum ON width finish signal Tmot_X with a short maximum ON width is output.

Conversely, in the event that the load LD is not in a very light load condition, the synchronous drive signal Vgs at the reference time signal Tsrs_1 fall timing t2 is H, meaning that the charging current I1 flows into the two capacitors C1 and C2, and charges them, even after the reference time signal Tsrs_1 becomes L, because of which the maximum ON width of the maximum ON width finish signal Tmot_X increases.

That is, in the synchronous control circuit 4C of FIG. 7, the charging current I1 output from the constant current source 52 does not change while the gate signal Vgp is H, but after the switch S2 is turned off in synchronization with the reference time signal Tsrs_1 fall, only the capacitor C1 is charged by the charging current I1. Consequently, in the event that the load LD is a very light load at the point of reaching the time t2, it is possible to reduce the time (t1 to t5) until the charging voltage V_C1 of the capacitor C1 reaches the reference voltage REF1 of the comparator 54.

Embodiment 4

Next, a description will be given of a synchronous control circuit which is configured in such a way as to change a voltage value that forms a comparison reference at a time of a discontinuous variable control of the maximum ON width.

Figure 9:
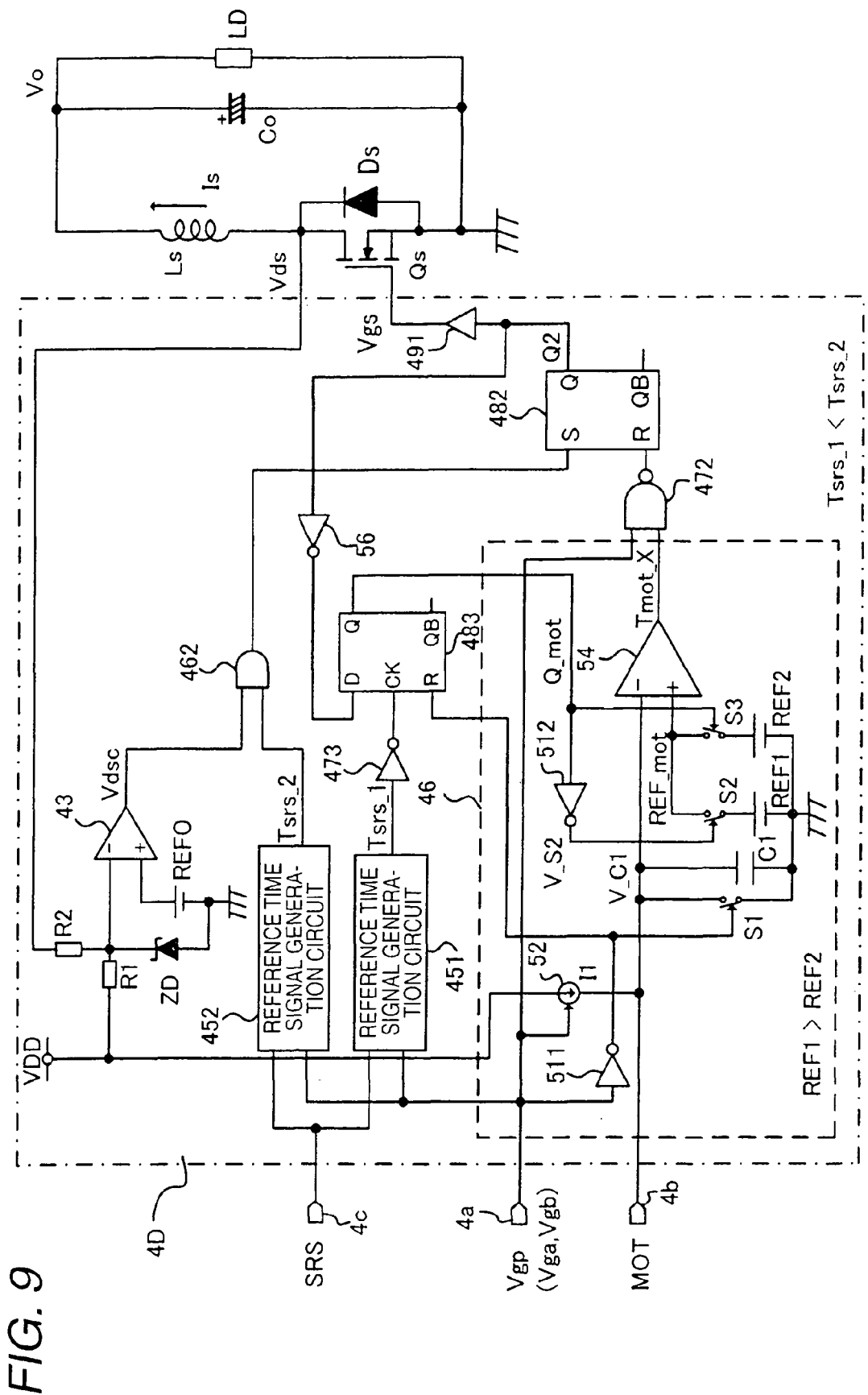
FIG. 9 is a circuit diagram illustrating a synchronous control circuit according to Embodiment 4.

FIG. 9 is a circuit diagram illustrating a synchronous control circuit according to Embodiment 4.

Herein too, a synchronous control circuit 4D is shown as a representative of the synchronous control circuits 41 and 42 of FIG. 1. The synchronous control circuit 4D, being configured of two resistors R1 and R2, a Zener diode ZD, a comparator 43, first and second reference time signal generation circuits 451 and 452, a maximum ON width control circuit 46, and logic circuits such as an AND circuit 462, a NAND circuit 472, second and third flip-flop circuits 482 and 483, and inverters 473 and 56, outputs a synchronous drive signal Vgs to the synchronous rectification MOSFET Qs via a buffer circuit 491. The synchronous control circuit 4D is the same as the heretofore described configuration of the synchronous control circuits 4B and 4C of Embodiments 2 and 3, with the exception of the maximum ON width control circuit 46. Therein, in giving a specific description of differences between a configuration of the maximum ON width control circuit 46 and those of Embodiments 2 and 3, identical reference characters and numerals will be given to portions corresponding to those of the synchronous control circuits 4B and 4C, and a description thereof will be omitted.

In the synchronous control circuit 4D of Embodiment 4, the maximum ON width control circuit 46 includes, as well as a comparator 54, one constant current source 52, one capacitor C1, and two reference voltage sources REF1 and REF2 which can be switched by switches S2 and S3. A variable reference voltage REF_mot input into the comparator 54, either the reference voltage source REF1 or REF2 being selected and connected by the switch S2 and switch S3, which are alternately ON-OFF controlled, is discontinuously controlled. Voltage values of the two reference voltage sources REF1 and REF2 being of mutually differing sizes, it is taken herein that REF1>REF2. Also, a switching signal Q_mot which controls the switch S3, and furthermore, via an inverter 512, a control signal V_S2 which switches the switch S2, are supplied from an output terminal Q of the third flip-flop circuit 483. Then, the comparator 54 is configured so as to compare a charging voltage V_C1 of the capacitor C1 with the discontinuously controlled variable reference voltage REF_mot, and output a maximum ON width finish signal Tmot_X.

FIG. 10 is a timing diagram illustrating a secondary side current control operation by the synchronous control circuit of FIG. 9. A of FIG. 10 illustrates the gate signal Vgp from the drive circuit 3 shown in FIG. 1. Also, B and C of FIG. 10 illustrate the first and second reference time signals Tsrs_1 and Tsrs_2. Also, D of FIG. 10 illustrates a waveform of the level detection signal Vdsc. Furthermore, E of FIG. 10 illustrates the control signal V_S2 which turns the switch S2 ON and off, F and G of FIG. 10 the variable reference voltage REF_mot and the charging voltage V_C1 of the capacitor C1, and H and I of FIG. 10 illustrate the maximum ON width finish signal Tmot_X and synchronous drive signal Vgs respectively.

Herein, the maximum ON width of the maximum ON width finish signal Tmot_x is varied between two ways by the switching of the variable reference voltage REF_mot. That is, the reference voltage REF_mot is varied as a threshold value for determining the charging voltage V_C1 of the capacitor C1.

On the gate signal Vgp rising, and the switch S1 being turned off, at a timing t1, the charging of the capacitor C1 is started. At this time, it being immediately after the reset of the third flip-flop circuit 483 is released, the control signal V_S2 of the switch S2 is H, meaning that the larger reference voltage source REF1 is selected as the variable reference voltage REF_mot.

As the synchronous drive signal Vgs is still L at the reference time signal Tsrs_1 fall timing t2 in the event that the load LD is a very light load, on an H signal being input into a D input terminal of the flip-flop circuit 483 from the inverter 56, and a clock being input into the third flip-flop circuit 483, at the time t2, the third flip-flop circuit 483 loads the H signal. At this time, the switching signal Q_mot which controls the switch S3 is output from the output terminal Q of the flip-flop circuit 483, the switch S3 on the reference voltage source REF2 side is turned ON, and the control signal V_S2 of the switch S2, which has been ON during the reference time signal Tsrs_1 H period (t1 to t2), becomes L. Because of this, as a variable reference voltage REF_mot switched to the reference voltage source REF2, which is lower than the reference voltage source REF1, is applied to the comparator 54, the charging voltage V_C1 of the capacitor C1 exceeds the variable reference voltage REF_mot at a timing t5. Consequently, a maximum ON width finish signal Tmot_X with a short maximum ON width is output from the maximum ON width control circuit 46.

Conversely, in the event that the load LD is not in a very light load condition, the synchronous drive signal Vgs at the reference time signal Tsrs_1 fall timing t2 is H. For this reason, the control signal V_S2 of the switch S2 remains unchanged at H, and the variable reference voltage REF_mot also maintains the original condition in which the reference voltage source REF1 is selected. Consequently, as the charging voltage V_C1 of the capacitor C1 continues to rise toward the variable reference voltage REF_mot after the timing t5, the maximum ON width of the maximum ON width finish signal Tmot_X output from the maximum ON width control circuit 46 increases.

Embodiment 5

Next, a description will be given of another synchronous control circuit which changes a voltage value which forms a comparison reference at a time of a discontinuous variable control of the maximum ON width.

Figure 11:
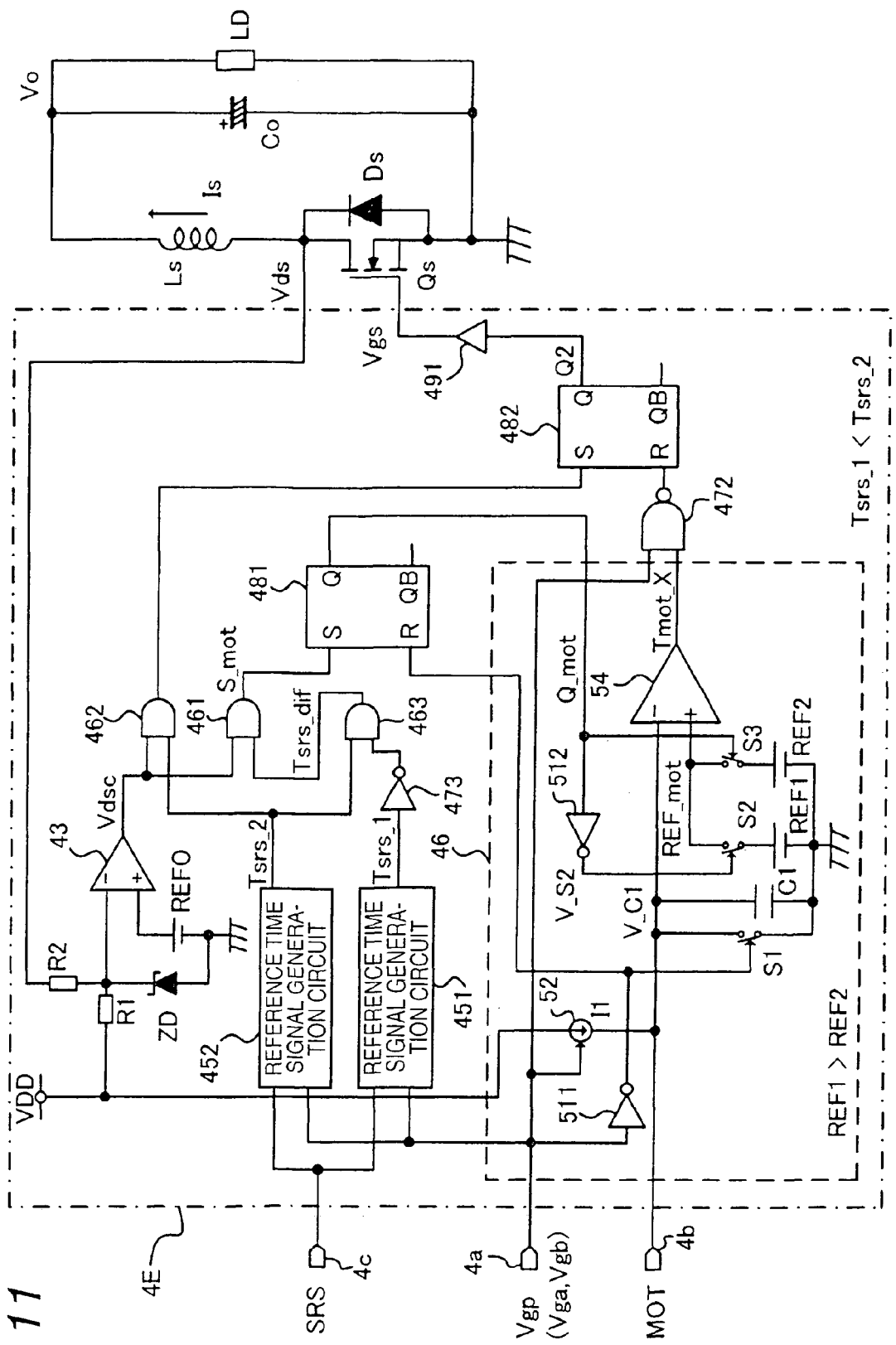
FIG. 11 is a circuit diagram illustrating a synchronous control circuit according to Embodiment 5.

FIG. 11 is a circuit diagram illustrating a synchronous control circuit according to Embodiment 5.

Herein too, a synchronous control circuit 4E is shown as a representative of the synchronous control circuits 41 and 42 of FIG. 1. The synchronous control circuit 4E, being configured of two resistors R1 and R2, a Zener diode ZD, a comparator 43, first and second reference time signal generation circuits 451 and 452, a maximum ON width control circuit 46, and logic circuits such as AND circuits 461 to 463, a NAND circuit 472, first and second flip-flop circuits 481 and 482, and an inverter 473, outputs a synchronous drive signal Vgs to the synchronous rectification MOSFET Qs via a buffer circuit 491. Although the maximum ON width control circuit 46 is of the same configuration as that used in the heretofore described synchronous control circuit 4D of Embodiment 4, the synchronous control circuit 4E, when determining the very light load, determines in the flip-flop circuit 481 using the level detection signal Vdsc. Hereafter, in giving a specific description of differences between a configuration of the synchronous control circuit 4E and that of Embodiment 4, identical reference characters and numerals will be given to other corresponding portions, and a description thereof will be omitted.

In the synchronous control circuit 4E of FIG. 11, the first reference time signal generation circuit 451 is connected to one input terminal of the AND circuit 463 via the inverter 473 which inverts a reference time signal Tsrs_1, which is the output of the first reference time signal generation circuit 451. The second reference time signal generation circuit 452 is connected to the other input terminal of the AND circuit 463. In the AND circuit 463, a third reference time signal Tsrs_dif is generated corresponding to a difference between the reference time signals Tsrs_1 and Tsrs_2, which are the outputs of the first and second reference time signal generation circuits 451 and 452.

The third reference time signal Tsrs_dif is input into the AND circuit 461 along with the level detection signal Vdsc, and a voltage switching signal S_mot for determining the load condition is generated, and supplied to a set terminal (S) of the flip-flop circuit 481. The voltage switching signal S_mot is input into the flip-flop circuit 481 as a signal which detects whether or not the level detection signal Vdsc has become H while the third reference time signal Tsrs_dif is H, and a switching signal Q_mot is supplied from the flip-flop circuit 481, which holds a result of the detection, to the maximum ON width control circuit 46.

FIG. 12 is a timing diagram illustrating a secondary side current control operation by the synchronous control circuit of FIG. 11. A of FIG. 12 illustrates the gate signal Vgp from the drive circuit 3 shown in FIG. 1. Also, B, C and D of FIG. 12 illustrate the first, second, and third reference time signals Tsrs_1, Tsrs_2, and Tsrs_dif. Also, E of FIG. 12 illustrates a waveform of the level detection signal Vdsc, F of FIG. 12 illustrates the voltage switching signal S_mot, and G of FIG. 12 the switching signal Q_mot. Furthermore, H and I of FIG. 12 illustrate the variable reference voltage REF_mot and the charging voltage V_C1 of the capacitor C1, and J and K of FIG. 12 illustrate the maximum ON width finish signal Tmot_X and synchronous drive signal Vgs respectively.

Herein, in the same way as in Embodiment 4, the maximum ON width of the maximum ON width finish signal Tmot_x is varied between two ways by the switching of the variable reference voltage REF_mot. In the maximum ON width control circuit 46, the capacitor C1 is charged by a charging current I1 from a constant current source 52, and the variable reference voltage REF_mot is variably controlled as a threshold value for determining the charging voltage V_C1 of the capacitor C1. The charging of the capacitor C1 is started by the gate signal Vgp rising to H, and the switch S1 being turned off. At this time, it being immediately after the reset of the flip-flop circuit 481, which decides the switching signal Q_mot, is released, the switch S2 is turned ON by the switching signal Q_mot. That is, the reference voltage source REF1, which has a voltage value higher than that of the reference voltage source REF2, is selected as the variable reference voltage REF_mot of the comparator 54.

In the event that the load LD is a very light load, the level detection signal Vdsc becomes H after the first reference time signal Tsrs_1 becomes L. Furthermore, as long as the condition is not of a load so light that the synchronous rectification MOSFET Qs is not turned on, the level detection signal Vdsc becomes H before the second reference time signal Tsrs_2 finishes. At this time, as the level detection signal Vdsc becomes H between the first reference time signal Tsrs_1 finishing, and falling to L, and the second reference time signal Tsrs_2 finishing, that is, in the period between the timings t2 and t4 when the third reference time signal Tsrs_dif is H, H of the level detection signal Vdsc from the AND circuit 462 is output. Consequently, as the switching signal Q_mot switches to H from the timing t3, at which the voltage switching signal S_mot becomes H and is output, the variable reference voltage REF_mot switches to the reference voltage source REF_2, which is lower than the reference voltage source REF_1. Because of this, as a variable reference voltage REF_mot switched to the lower reference voltage source REF2 is applied to the comparator 54, the charging voltage V_C1 of the capacitor C1 exceeds the variable reference voltage REF_mot at a timing t5, as shown in H of FIG. 12. Consequently, a maximum ON width finish signal Tmot_X with a short maximum ON width is output from the maximum ON width control circuit 46.

Conversely, in the event that the load LD is not in a very light load condition, the level detection signal Vdsc becomes H by the time the reference time signal Tsrs_1 finishes (before becoming L). For this reason, as the voltage switching signal S_mot does not switch to H, the second switching signal Q_mot remains unchanged at L, and the variable reference voltage REF_mot also maintains the original condition in which the higher reference voltage source REF1 is selected. Consequently, as the charging voltage V_C1 of the capacitor C1 continues to rise toward the variable reference voltage REF_mot after the timing t5, the maximum ON width of the maximum ON width finish signal Tmot_X output from the maximum ON width control circuit 46 increases.

In the event that the level detection signal Vdsc changes to H after the second reference time signal Tsrs_2 finishes, it being in a very light load condition close to a no-load condition, the voltage switching signal S_mot does not become H in this case either. Consequently, the variable reference voltage REF_mot remains at the reference voltage source REF1, but as the synchronous rectification MOSFET Qs is not turned ON in the first place, there is no meaning to the control here.

Embodiment 6

Next, with regard to a switching power source device according to Embodiment 6, a description will be given of a specific configuration of synchronous control circuits 41 and 42 thereof.

Figure 13:
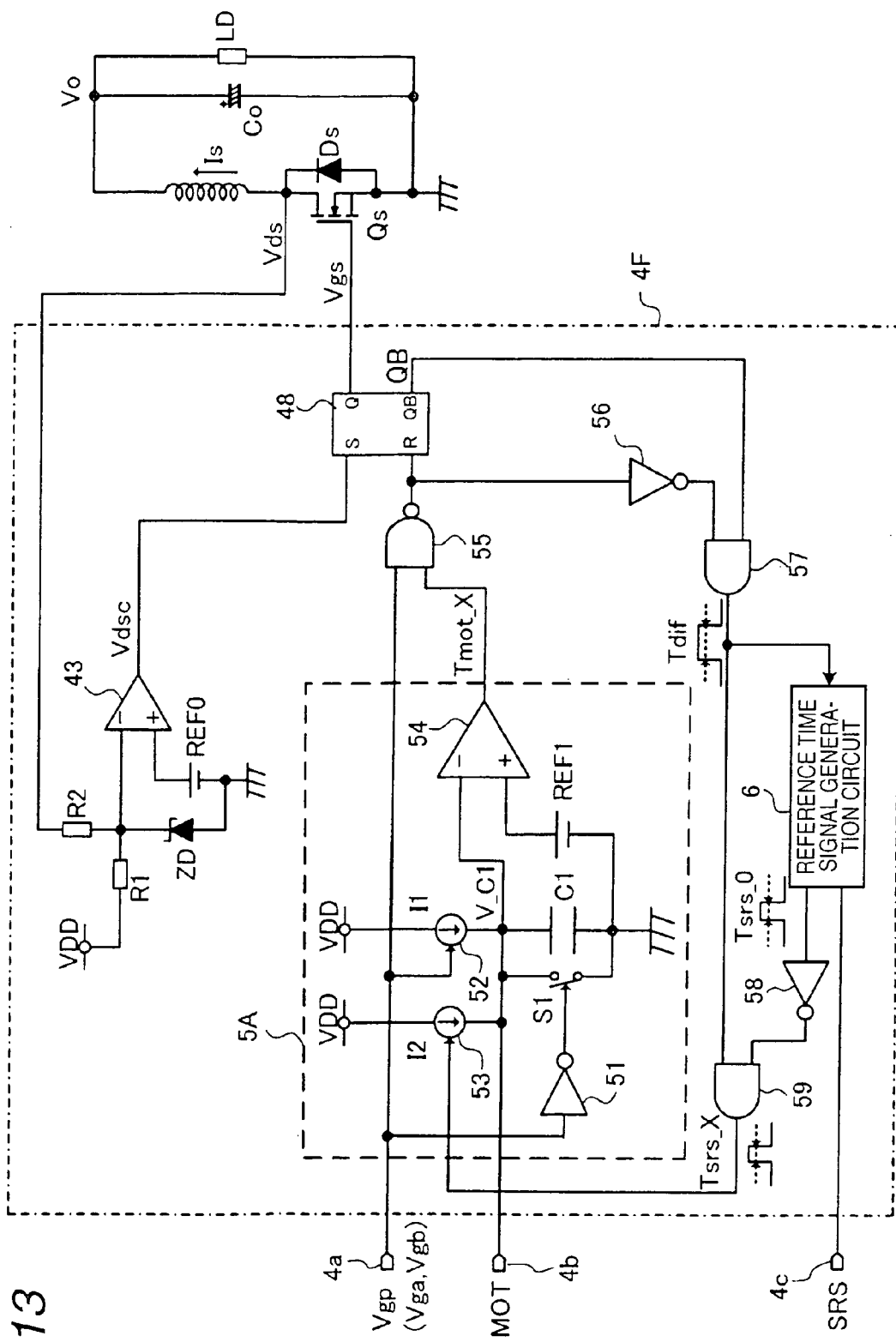
FIG. 13 is a circuit diagram illustrating a synchronous control circuit according to Embodiment 6.

FIG. 13 is a circuit diagram illustrating a synchronous control circuit according to Embodiment 6. Herein, identical reference characters and numerals will be given to portions corresponding to the circuit portions shown in Embodiment 1 (FIG. 2), and a detailed description thereof will be omitted. Also, a synchronous control circuit 4F of FIG. 13 represents the two synchronous control circuits 41 and 42 in the same way as the synchronous control circuit 4A of FIG. 2, the internal diodes Ds are connected in parallel between the drain and source of the synchronous rectification MOSFET Qs.

In FIG. 13, what is different from Embodiment 1 is that only one each of the maximum ON width control circuit 5A, reference time signal generation circuit 6, and flip-flop circuit 48 are provided, and the maximum ON width of the synchronous drive signal Vgs is continuously changed, as described hereafter.

The maximum ON width control circuit 5A, as shown in FIG. 13, is configured of an inverter 51 connected to a gate signal input terminal 4a, constant current sources 52 and 53 connected to a power source voltage VDD, a capacitor C1, of which one extremity is connected to the constant current sources 52 and 53 and the other extremity is grounded, a switch S1, which controls a charge and discharge of a charging voltage V_C1 of the capacitor C1, and a comparator 54, which compares the charging voltage V_C1 of the capacitor C1 with a reference voltage REF1, and outputs a maximum ON width finish signal Tmot_X. One input terminal of a NAND circuit 55 is connected to the gate signal input terminal 4a, the other input terminal is connected to the output terminal of the comparator 54, and the output terminal is connected to a reset terminal (R) of a flip-flop circuit 48.

Herein, as a logical product (a negative thereof) of the gate signal Vgp and maximum ON width finish signal Tmot_X is taken in the NAND circuit 55, the flip-flop circuit 48 is reset at a timing at which the maximum ON width finish signal Tmot_X becomes L, or a timing at which the gate signal Vgp, its ON period finishing, becomes L, whichever timing is earlier.

An MOT terminal 4b, by a resistor, a capacitor, or the like being connected thereto, can adjust an output timing of the maximum ON width finish signal Tmot_X output from the comparator 54 in accordance with a resonant frequency fr1. In the event of connecting a resistor, a current from the constant current sources 52 and 53 is split by the resistor, and it is possible to delay the output timing of the maximum ON width finish signal Tmot_X in accordance with the resistance value of the resistor.

In FIG. 13, arrows associated with the constant current sources 52 and 53 from the left, represent an input of a control signal into the constant current sources 52 and 53, so that the constant current sources 52 and 53 supply a constant current when the relevant control signal is H, and stop the supply of the constant current when it is L. Also, in the event of connecting a capacitor to the MOT terminal 4b, it being equivalent to a capacity value of the capacitor C1 increasing, it is possible by this means to delay the output timing of the maximum ON width finish signal Tmot_X.

An output terminal of the NAND circuit 55 is also connected to one input terminal of an AND circuit 57 via an inverter 56. Herein, an inverted output signal QB is supplied to the other input terminal of the AND circuit 57 from the flip-flop circuit 48. A level detection signal Vdsc, which is the output of the comparator 43, is supplied to a set terminal (S) of the flip-flop circuit 48. The inverter 56 and AND circuit 57 configure an arithmetic circuit which generates a pulse signal of a duration corresponding to an internal diode Ds conduction timing delay time Tdif decided in accordance with the size of a load LD.

As well as the pulse signal from the AND circuit 57 being input, an SRS terminal 4c is connected to the reference time signal generation circuit 6. A reference time signal Tsrs_0 having a predetermined duration is generated in the reference time signal generation circuit 6 as a reference for determining whether there is a very light load condition, and supplied to one input terminal of an AND circuit 59 via an inverter 58. The reference time signal generation circuit 6 can be configured of a one-shot multivibrator which, being triggered by the rise of the pulse signal from the AND circuit 57, adjusts the duration of the reference time signal Tsrs_0 using an external part connected to the SRS terminal 4c. However, the one-shot multivibrator itself being commonly known, any further description relating to this will be omitted. Also, an output terminal of the AND circuit 57 is connected to the other input terminal of the AND circuit 59. That is, in the AND circuit 59, a configuration is such that the internal diode Ds conduction timing delay time Tdif is compared with the reference time signal Tsrs_0 every time the MOSFET Qa (or MOSFET Qb) is turned on, and a new reference time signal Tsrs_X which has a variable duration corresponding to their differential signal (Tdif–Tsrs_0) is output. The duration of the reference time signal Tsrs_0 is appropriately set by the reference time signal generation circuit 6 in accordance with a resistance value of an external resistor attached to the exterior of the SRS terminal 4c, or the like.

Next, a description will be given of an operation of the switching power source device according to Embodiment 6.

FIG. 14 is a timing diagram illustrating a secondary side current control operation by the synchronous control circuit of FIG. 13. A of FIG. 14 illustrates the gate signal Vgp from the drive circuit 3 shown in FIG. 1, and B of FIG. 14 a reset signal R. The reset signal R being a signal output from the NAND circuit 55 to a reset terminal (R) of the flip-flop circuit 48, it inverts to L in synchronization with a gate signal Vgp rise timing t1.

C of FIG. 14 illustrates the reference time signal Tsrs_0 output from the reference time signal generation circuit 6. The reference time signal Tsrs_0, rising in synchronization with the gate signal Vgp rise timing t1, decides a reference time for determining whether or not the load LD is a very light load with its predetermined duration (t1 to t2).

D to G of FIG. 14 respectively illustrate the level detection signal Vdsc, the inverted output signal QB of the flip-flop circuit 48, the internal diode Ds conduction timing delay time Tdif, and a signal waveform of the new reference time signal Tsrs_X.

As the level detection signal Vdsc is the set input of the flip-flop circuit 48, the inverted output signal QB of the flip-flop circuit 48 inverts to L at a timing t3 at which the level detection signal Vdsc inverts to H, as shown in E of FIG. 14. The level detection signal Vdsc is the same as the one already described in Embodiment 1. Also, a pulse signal Tdif (given the same reference characters as the delay time Tdif) of F of FIG. 14, being output from the AND circuit 57, is a logical product signal of a signal which is the reset signal R of B of FIG. 14 inverted, and the inverted output signal QB of E of FIG. 14, and corresponds to the internal diode Ds conduction timing delay time Tdif while the pulse signal Tdif is H (t1 to t3). The new reference time signal Tsrs_X shown in G of FIG. 14, being a logical product signal of a signal which is the reference time signal Tsrs_0 of C of FIG. 14 inverted, and the pulse signal Tdif of F of FIG. 14, is output from the AND circuit 59, and input into the maximum ON width control circuit 5A as a control signal of the constant current source 53.

Figure 14A:
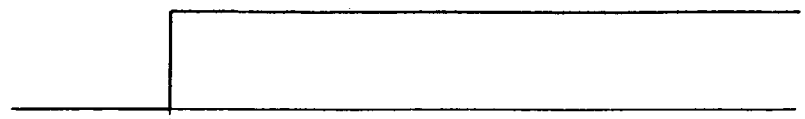
FIGS. 14A-14J are timing diagrams illustrating a secondary side current control operation by the synchronous control circuit of FIG. 13.
Figure 14B:
Figure 14C:
Figure 14D:
Figure 14E:
Figure 14F:
Figure 14G:
Figure 14H:
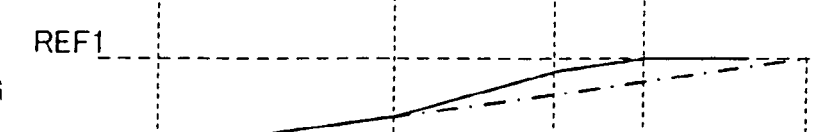
Figure 14I:
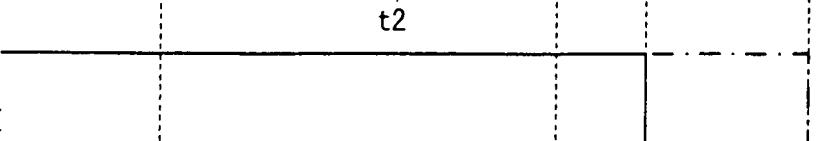
Figure 14J:

FIGS. 14H to 14J respectively illustrate the charging voltage V_C1 of the capacitor C1, the maximum ON width finish signal Tmot_X, and a signal waveform of the synchronous drive signal Vgs output from the synchronous control circuit 4F. Herein, on the gate signal Vgp of the gate signal input terminal 4a rising to H at the timing t1, the switch S1 is turned off by the output of the inverter 51 in the maximum ON width control circuit 5A, and the capacitor C1 begins to be charged with a current I1 from the constant current source 52. As the switch S1 is ON in the preceding condition in which the gate signal Vgp is L, the capacitor C1 is in a discharged condition. For this reason, in the condition in which the gate signal Vgp is L, the maximum ON width finish signal Tmot_X is H.

Now, assuming it that the load LD is not in a very light load condition, that is, in the event that the duration of the pulse signal Tdif is shorter than the duration of the reference time signal Tsrs_0 (t3<t2), the new reference time signal Tsrs_X is not input into the maximum ON width control circuit 5A. In this case, as only the current I1 from the constant current source 52 is applied to the capacitor C1, the charging voltage V_C1 of the capacitor C1 rises linearly, as shown by the dashed-dotted line in H of FIG. 14, and that forms the voltage of an inverted input terminal (−) of the comparator 54. Then, on reaching a timing t5 at which the voltage of the inverted input terminal (−) reaches a reference voltage REF1 of a non-inverted input terminal (+), and the maximum ON width finish signal Tmot_X, which is the output of the comparator 54, inverts from H to L, the finish of the maximum ON width is output to the NAND circuit 55. That is, the maximum ON width finish signal Tmot_X becomes L at the timing t5, as shown by the dashed-dotted line in I of FIG. 14, and the output of the NAND circuit 55 becomes H, resetting the flip-flop circuit 48.

As opposed to this, in the event that it is determined that the load LD is in a very light load condition, that is, in the event that the duration of the pulse signal Tdif is longer than the duration of the reference time signal Tsrs_0 (t2<t3), on reaching the timing t2 specified by the reference time signal Tsrs_0 from the reference time signal generation circuit 6, the kind of new reference time signal Tsrs_X shown in G of FIG. 14 is output from the AND circuit 59 for a predetermined duration. For this reason, a current I2 also flows from the constant current source 53, and the capacitor C1 begins to be charged with a current (I1+I2) of a size differing from that until the timing t2. That is, as the charging voltage V_C1 of the capacitor C1 rises at a gradient steeper than before during the duration of the new reference time signal Tsrs_X (t2 to t3), as shown by the solid line in H of FIG. 14, it is possible to shorten the time for charging the capacitor C1 to the reference voltage REF1. In this way, as the reset signal R of the flip-flop circuit 48 becomes H at a timing t4 (refer to B of FIG. 14), which comes earlier the longer the pulse width of the new reference time signal Tsrs_X, the synchronous drive signal Vgs falls to L, as shown in J of FIG. 14. In the event that the internal diode Ds conduction timing delay time Tdif becomes even longer with respect to the reference time signal Tsrs_0, and the level detection signal Vdsc does not yet become H even though the maximum ON width finish signal Tmot_X has become L, even in the event that the level detection signal Vdsc subsequently becomes H, the reset signal of the reset prioritizing flip-flop circuit 48 becomes H first, so it does not happen that the synchronous drive signal Vgs is output.

Subsequently, on the switch S1 being turned ON by the gate signal Vgp, the capacitor C1 is discharged, and the maximum ON width finish signal Tmot_X becomes H. Although the timing per se at which the maximum ON width finish signal Tmot_X becomes H does not coincide with the timing at which the gate signal Vgp becomes H, by the gate signal Vgp being input into the NAND circuit 55, the timing at which the reset signal R of the flip-flop circuit 48, which is the output signal of the NAND circuit 55, becomes L coincides with the timing at which the gate signal Vgp becomes H, as shown in B of FIG. 14. The output signal of the NAND circuit 55 is input into the reset terminal (R) of the flip-flop circuit 48, because of which the maximum ON width control circuit 5A can indicate the start (the finish of the flip-flop circuit 48 reset) timing of the maximum ON width. Consequently, with regard to the timing of the start and finish of the maximum ON width in Embodiment 6 too, it is possible to indicate the same timing as the maximum ON width signal Tmot in the case of using the one-shot multivibrator of Embodiment 1, because of which it is possible to set a maximum ON width which has an optimum ON width.

Figure 15:
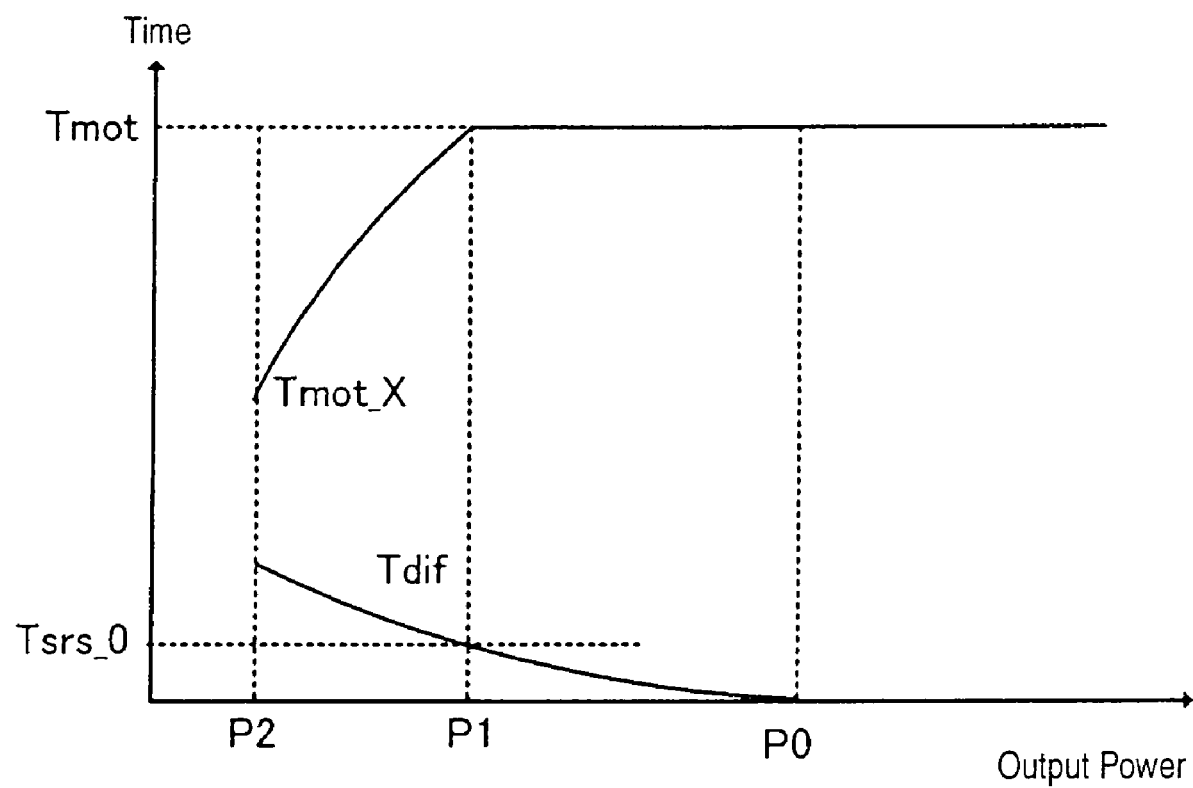
FIG. 15 is a graph illustrating a relationship between an internal diode conduction timing delay time and an output power.

FIG. 15 is a graph illustrating a relationship between the internal diode Ds conduction timing delay time Tdif and an output power.

The vertical axis represents a time axis, while the output power corresponding to the load LD is shown on the horizontal axis. Load points P2, P1, and P0 on the horizontal axis are powers largely corresponding to rated loads of 5%, 20%, and 50% respectively. As the maximum ON width finish signal Tmot_X fall timing becomes earlier than the level detection signal Vdsc rise timing on the load LD becoming smaller than the load point P2 (refer to FIG. 14), the synchronous rectification transistor is not turned on.

Also, on the output power decreasing, the synchronous rectification switch element conduction timing delay time Tdif increases. In the event that the conduction timing delay time Tdif is shorter than the reference time signal Tsrs_0, the constant current source 53 configuring the maximum ON width control circuit 5A shown in FIG. 13 ceases to contribute to the operation. For this reason, the maximum ON width finish signal Tmot_X becomes invariable decided only by the current value I1 of the constant current source 52 and the capacity value of the capacitor C1. In the kind of case in which the conduction timing delay time Tdif becomes longer than the reference time signal Tsrs_0, the current value I2 of the constant current source 53 is added to the charging current, meaning that the maximum ON width finish signal Tmot_X becomes shorter.

Heretofore, in the synchronous control circuit 4F of Embodiment 6, a reference time signal Tsrs_0 which has a predetermined duration is generated in the reference time signal generation circuit 6, and furthermore, a reference time signal Tsrs_X with a variable duration corresponding to a differential signal with a delay time Tdif (Tdif−Tsrs_0) is output to the maximum ON width control circuit 5A. In the maximum ON width control circuit 5A, as well as determining a very light load condition using the reference time signal Tsrs_X with the variable duration, instead of the two kinds of reference time signal Tsrs_1 and Tsrs_2 in the synchronous control circuits 4A to 4E of Embodiments 1 to 5, it is possible to continuously variably control the maximum ON width of the synchronous drive signal Vgs in the maximum ON width control circuit 5A by changing the finish timing of the maximum ON width finish signal Tmot_X so that it is earlier the longer the duration of the reference time signal Tsrs_X.

Embodiment 7

Next, a description will be given of another synchronous control circuit which continuously variably controls the maximum ON width of a synchronous rectification switch element.

Figure 16:
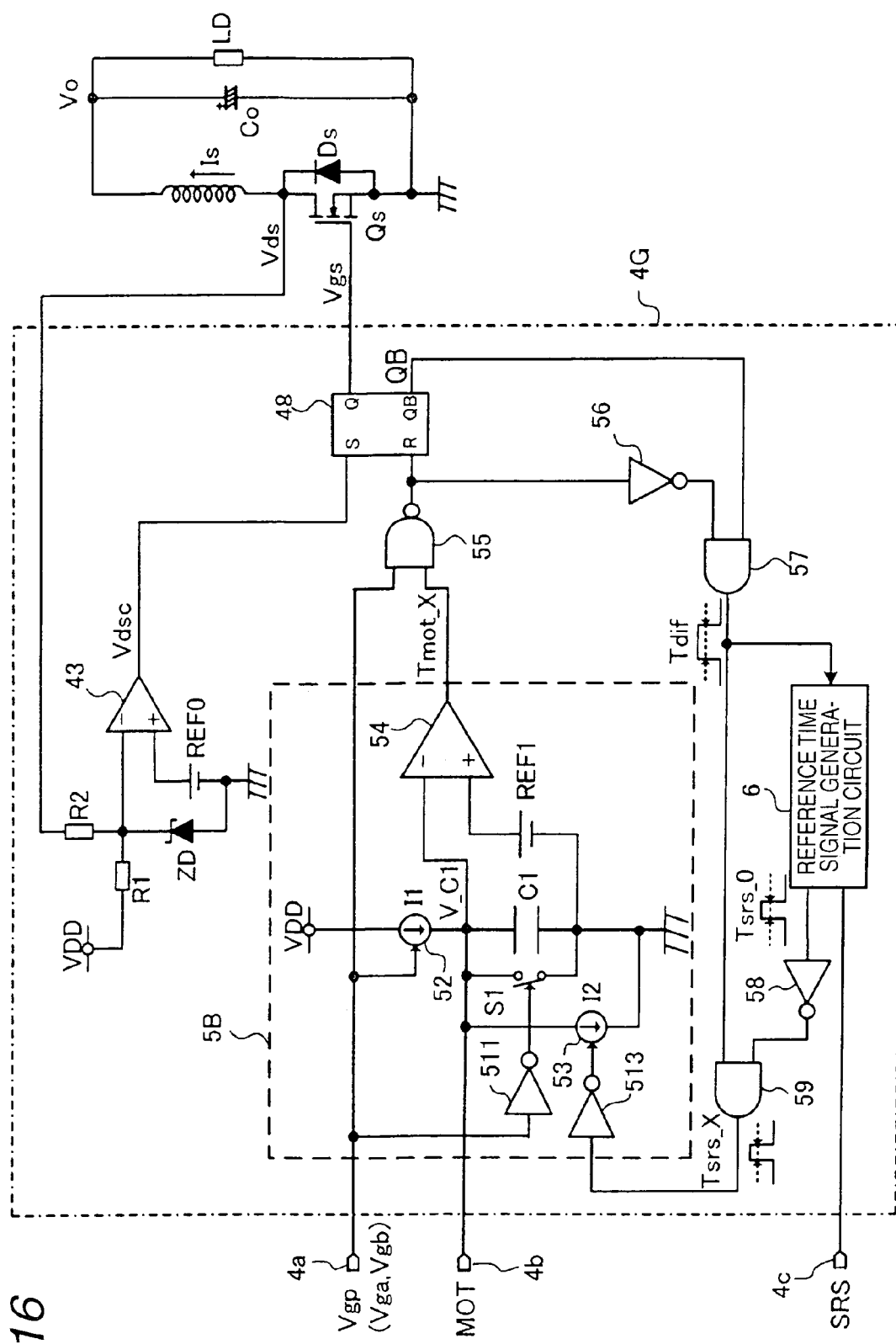
FIG. 16 is a circuit diagram illustrating a synchronous control circuit according to Embodiment 7.

FIG. 16 is a circuit diagram illustrating a synchronous control circuit according to Embodiment 7. Herein, identical reference characters and numerals will be given to portions corresponding to the circuit portions shown in Embodiment 6 (FIG. 13), and a detailed description thereof will be omitted.

One each of a maximum ON width control circuit 5B, a reference time signal generation circuit 6, and a flip-flop circuit 48 being provided, this synchronous control circuit 4G, as well as determining a very light load condition using a reference time signal Tsrs_X with a variable duration, changes the finish timing of a maximum ON width finish signal Tmot_X so that it is earlier the longer the duration of the reference time signal Tsrs_X. That is, a charge control and discharge control of the capacitor C1 being carried out by the maximum ON width control circuit 5B, the synchronous control circuit 4G is characterized in that it can realize a continuous control of the maximum ON width, in the same way as that of Embodiment 6.

The maximum ON width control circuit 5B is configured of an inverter 511 connected to a gate signal input terminal 4a, two constant current sources 52 and 53, a capacitor C1, of which one extremity is connected to the constant current sources 52 and the other extremity is grounded, a switch S1, which controls a charge and discharge of a charging voltage V_C1 of the capacitor C1, and a comparator 54, which compares the charging voltage V_C1 of the capacitor C1 with a reference voltage REF1, and outputs a maximum ON width finish signal Tmot_X. Herein, the configuration differs from that of the maximum ON width control circuit 5A described in Embodiment 6 in that the two constant current sources 52 and 53 are connected to each other in series, and moreover, the second constant current source 53 is disposed in parallel with the capacitor C1.

Next, regarding an operation of the switching power source device according to Embodiment 7, the basic operation of the synchronous control circuit 4G being as described in Embodiment 6, a description will be given here of an ON width control operation by the maximum ON width control circuit 5B.

Figure 17:
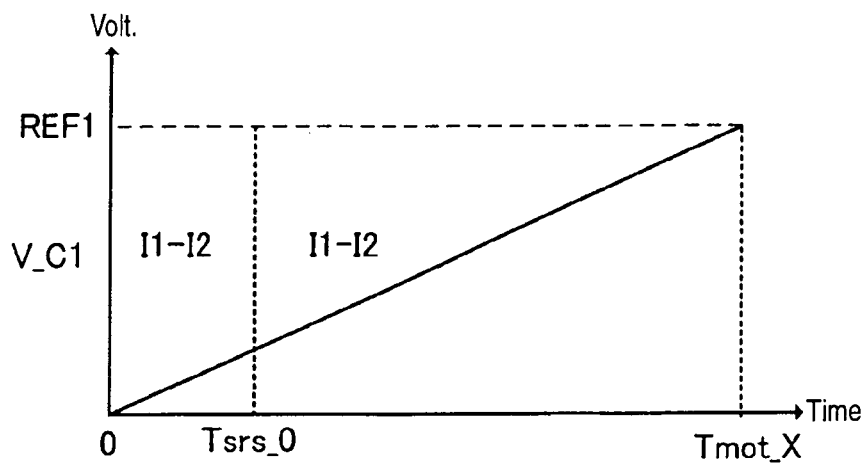
FIGS. 17A to 17C are graphs illustrating a control operation for each load condition in the synchronous control circuit of FIG. 16.
Figure 17:
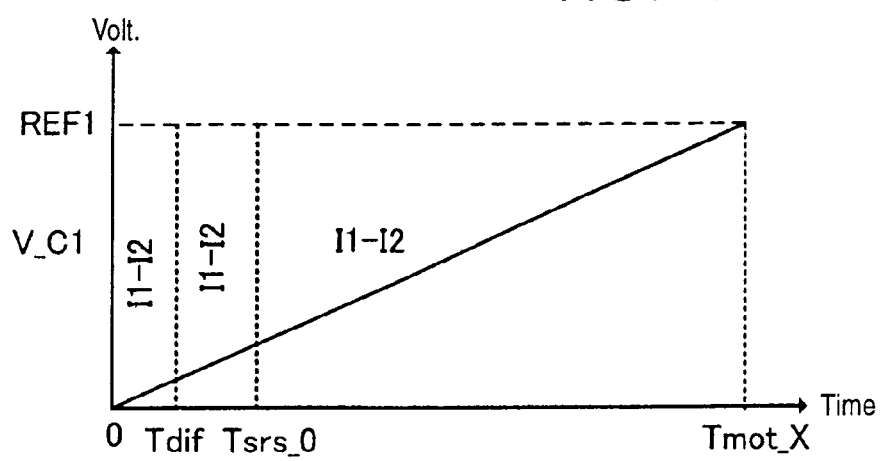
Figure 17:
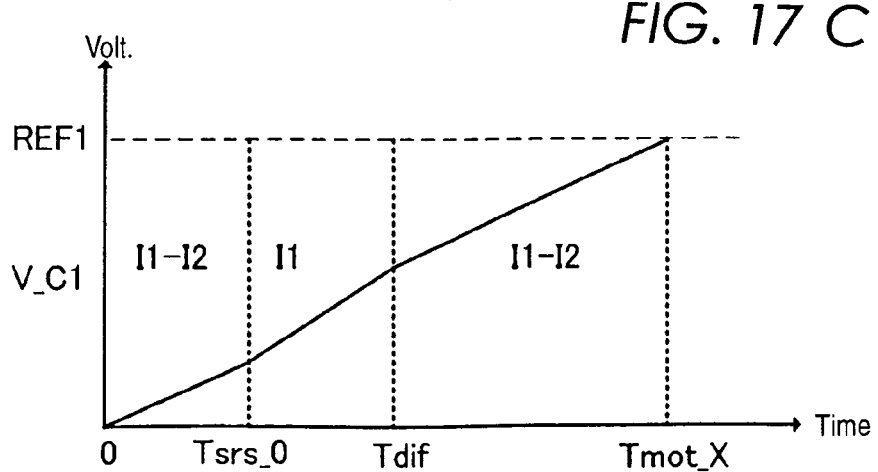
Figure 18:
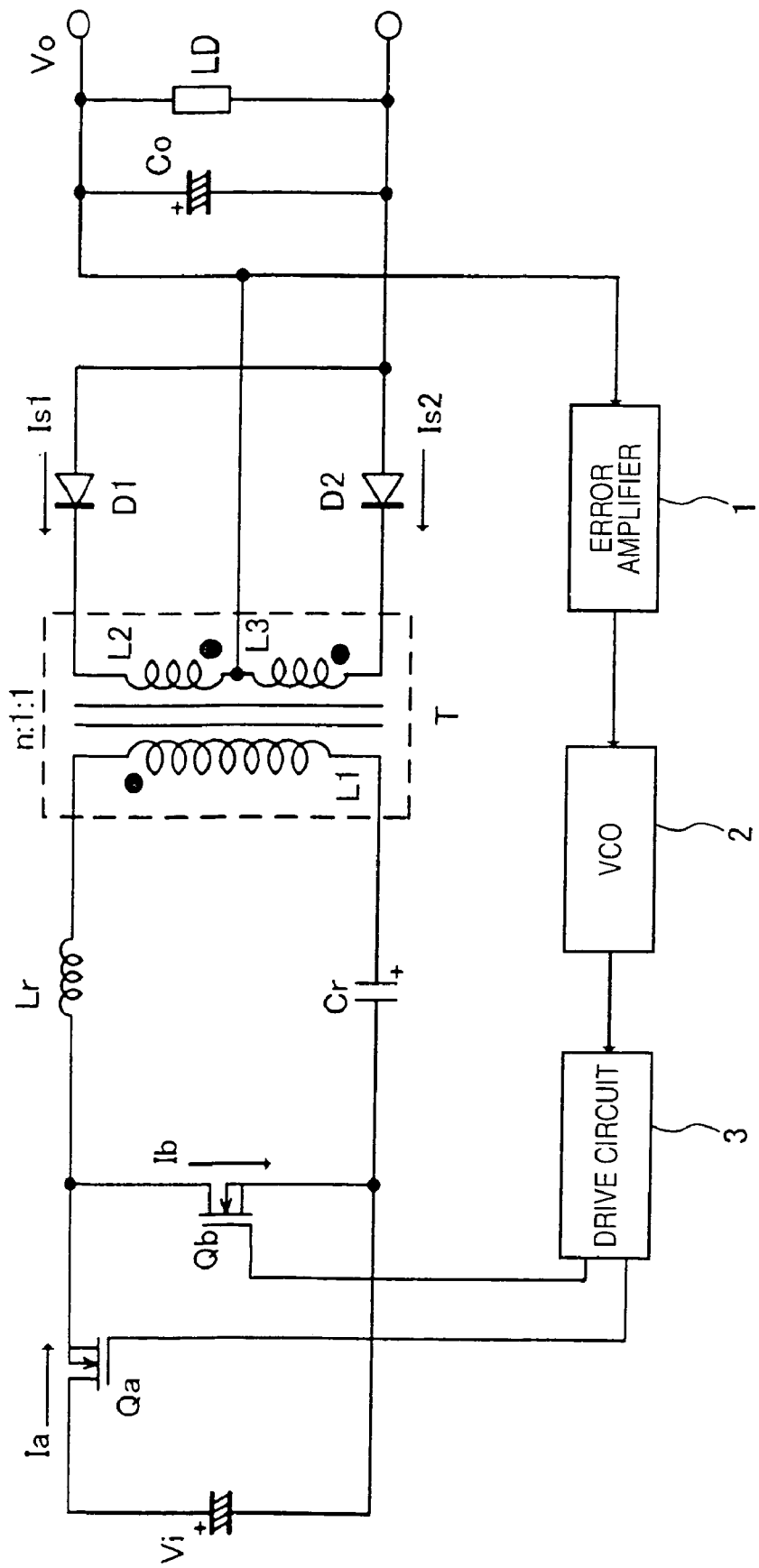
FIG. 18 is a circuit diagram illustrating one example of a heretofore known current resonant type converter.
Figure 19:
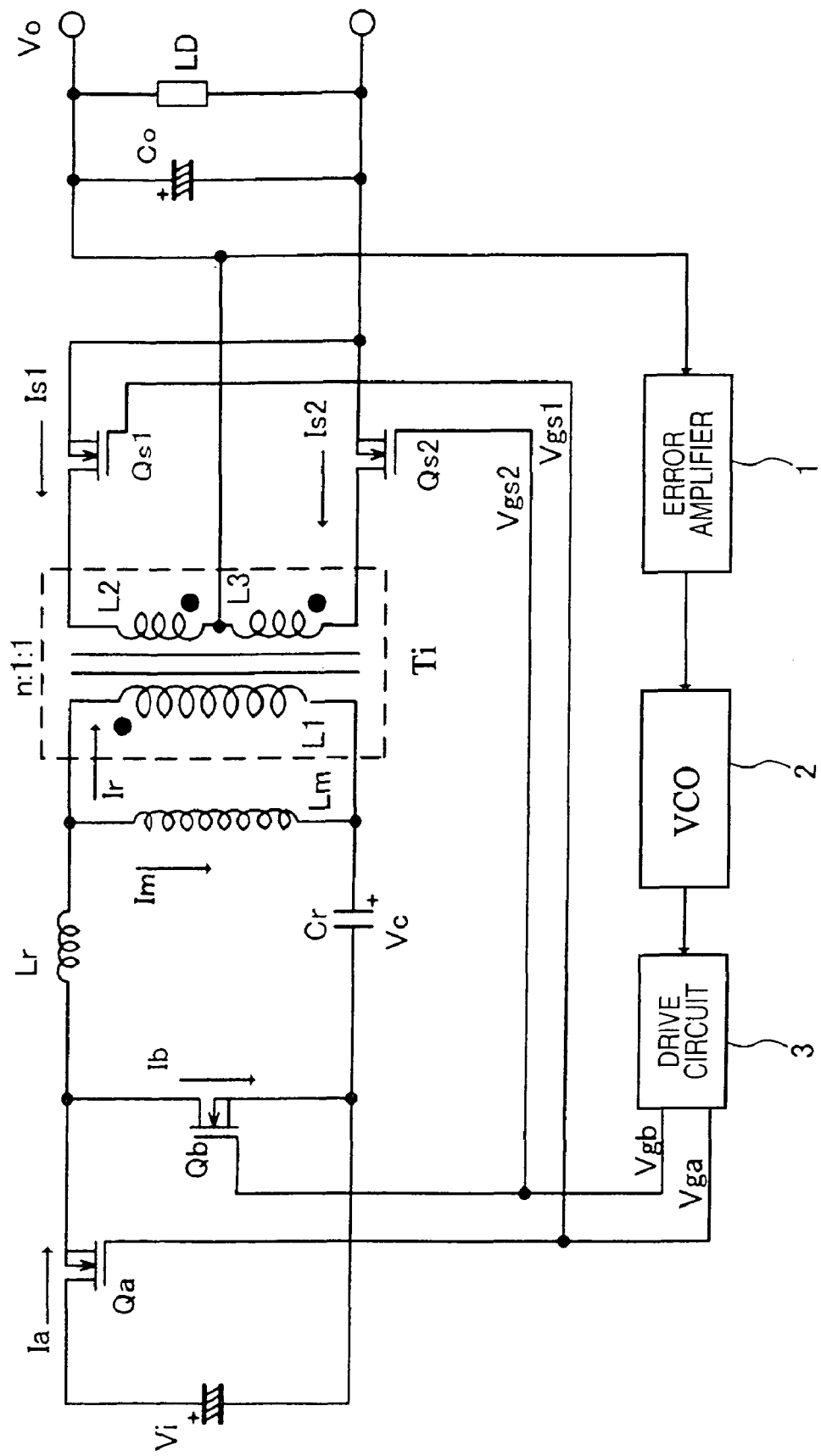
FIG. 19 is a diagram illustrating the current resonant type converter in which a rectification diode of FIG. 18 is replaced with a MOSFET.
Figure 27B:
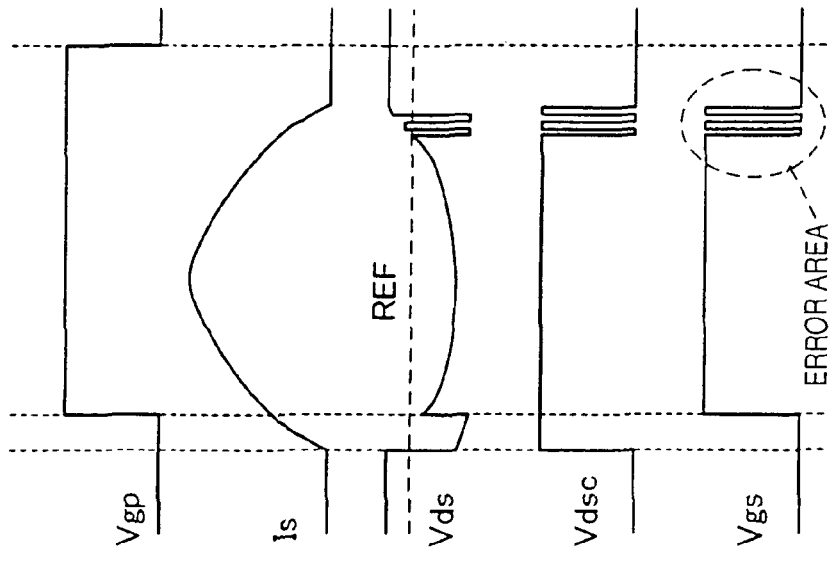
Figure 27A:
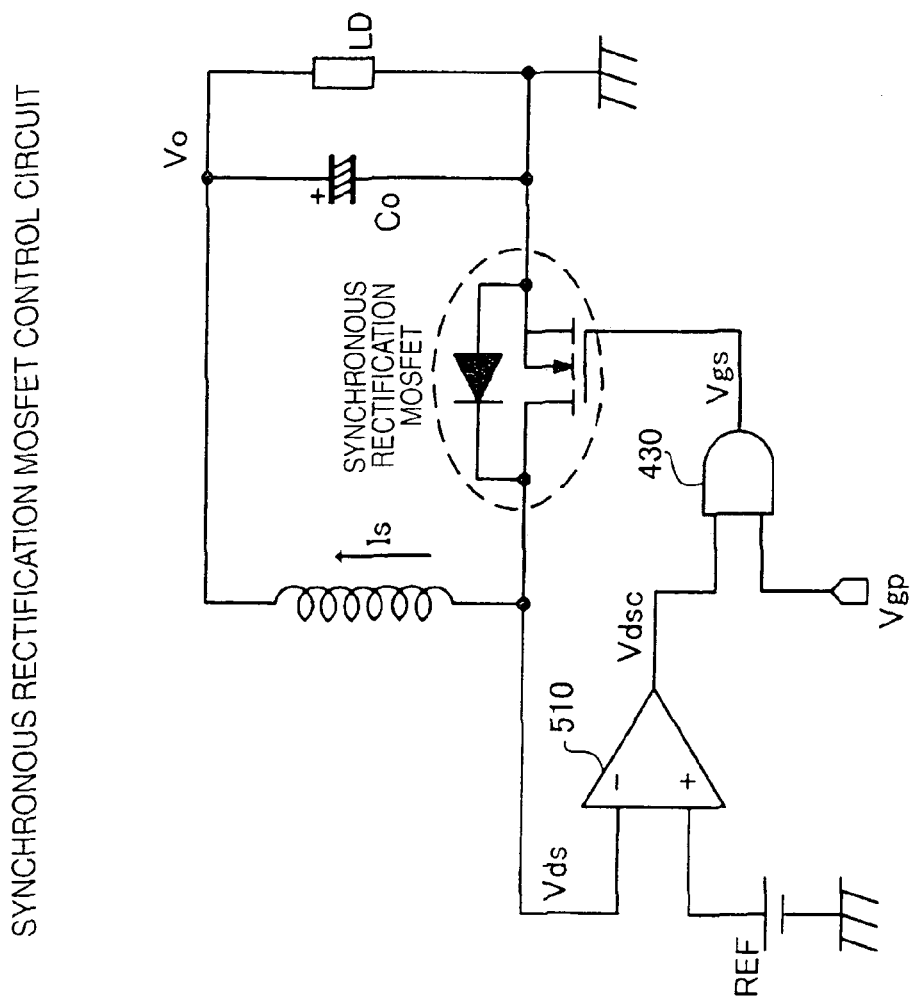

FIGS. 17A to 17C are graphs illustrating a control operation for each load condition in the synchronous control circuit of FIG. 16.

FIGS. 17A to 17C correspond respectively to a ratio of the size of a load LD with respect to a rated load (maximum load) being in a heavy load condition (for example, over 50%), a light load condition (for example, 20 to 50%), and a very light load condition (for example, under 20%), and are such that the horizontal axis is a time axis, and the vertical axis indicates a value of the charging voltage V_C1 generated in the capacitor C1 of the maximum ON width control circuit 5B. The origin (0) of the time axis corresponds to a timing (t1 in A of FIG. 14) at which a gate signal Vgp rises to H. Tsrs_0 and Tdif shown on the horizontal axis in FIGS. 17A to 17C are respectively times at which a reference time signal Tsrs_0 and a pulse signal (an internal diode Ds conduction timing delay time) Tdif (reference characters the same as the signal names are given to the times) finish (the signal changes from H to L).

In the heavy load condition (HL) shown in FIG. 17A, the internal diode Ds conduction timing delay time Tdif, decided in accordance with the size of the load LD, becomes 0, and the reference time signal Tsrs_X (=Tdif−Tsrs_0) with the variable duration, input from an AND circuit 59 into the maximum ON width control circuit 5B, becomes constantly L. Then, as a constant current I1 from the constant current source 52 is constantly split into a constant current I2 by the constant current source 53 in the maximum ON width control circuit 5B, the capacitor C1 is charged by a current value (I1-I2), which is smaller than the constant current I1. That is, the charging voltage V_C1 of the capacitor C1 rises linearly at a gradient depending on the capacity value and current value (I1-I2) of the capacitor C1. Consequently, the output of the NAND circuit 55 becomes H due to the maximum ON width finish signal Tmot_X output from the maximum ON width control circuit 5B, and the time until resetting the flip-flop circuit 48 increases.

In the light load condition (LL) shown in FIG. 17B, unlike the heavy load condition, the internal diode Ds conduction timing delay time Tdif does not become 0, but its size does not become equal to or longer than the reference time signal Tsrs_0. Consequently, the reference time signal Tsrs_X with the variable duration being constantly L, the charging voltage V_C1 of the capacitor C1 rises linearly, in the same way as in FIG. 17A.

In the very light load condition (VLL) shown in FIG. 17C, as the internal diode Ds conduction timing delay time Tdif becomes longer than the reference time signal Tsrs.0 (Tdif>Tsrs_0), the reference time signal Tsrs_X with the variable duration is supplied to the maximum ON width control circuit 5B as H from the time Tsrs_0 to the time Tdif. For this reason, after the gate signal Vgp rises to H, the constant current source 53 is shut off for a time depending on the ON duration of the reference time signal Tsrs_X, and the capacitor C1 is charged by the constant current I1 from the constant current source 52. As the charging current to the capacitor C1 increases in this period, the longer the period from the time Tsrs_0 to the time Tdif, the shorter the time until the output of the NAND circuit 55 becomes H due to the maximum ON width finish signal Tmot_X, resetting the flip-flop circuit 48.

As heretofore described, in the synchronous control circuit 4G according to Embodiment 7 too, in the same way as in Embodiment 6, as well as determining a very light load condition using the reference time signal Tsrs_X with the variable duration, it is possible to continuously variably control the maximum ON width of the synchronous drive signal Vgs in the maximum ON width control circuit 5B by making the finish timing of the maximum ON width finish signal Tmot_X earlier the longer the duration of the reference time signal Tsrs_X.

In the synchronous control circuits 4F and 4G of Embodiments 6 and 7, the very light load condition is determined with the reference time signal Tsrs_X, but it is also acceptable to delete the inverter 58, AND circuit 59, and reference time signal generation circuit 6, and supply the delay time Tdif to the maximum ON width control circuit instead of the reference time signal Tsrs_X.

The disclosures of Japanese Patent Applications No. 2008-307571 filed on Dec. 2, 2008 and No. 2009-188367 filed on Aug. 17, 2009 are incorporated herein.

While the invention has been explained with reference to the specific embodiments of the invention, the explanation is illustrative and the invention is limited only by the appended claims.

What is claimed is:

1. A switching power source device comprising:
    a series resonant circuit which includes a current resonant inductor and a current resonant capacitor;
    a plurality of main switch elements which switch a current path of the series resonant circuit by alternately turning ON and OFF;
    a transformer which induces a current from the series resonant circuit to a secondary side by ON-OFF controlling the main switch elements on a primary side;
    a plurality of synchronous rectification switch elements in which internal diodes are connected in parallel, and wherein each rectification switch element is turned ON and OFF in response to one of the plurality of main switch elements, rectifying the secondary current of the transformer; and
    a synchronous control circuit which turns the synchronous rectification switch element ON in synchronization with an ON timing of the main switch element corresponding to the synchronous rectification switch element, or with a conduction timing of the internal diodes detected by an inter-terminal voltage signal of the synchronous rectification switch element, whichever timing is later, and decides a maximum ON width of the synchronous rectification switch element in accordance with a delay time of the conduction timing of the internal diodes with respect to the ON timing of the main switch element,
    wherein the switching power source device indicates a start timing of the maximum ON width of the synchronous rectification switch element in synchronization with the ON timing of the main switch element corresponding to the synchronous rectification switch element.

2. The switching power source device according to claim 1, wherein the synchronous control circuit determines the maximum ON width of the synchronous rectification switch element by comparing the delay time of the conduction timing of the internal diodes with respect to the ON timing of the main switch element with a plurality of reference time signals.

3. The switching power source device according to claim 2, further comprising:
    first and second reference time signal generation circuits which generate, as the reference time signals, first and second reference time signals, which have mutually differing durations, at every ON timing of the main switch element corresponding to the synchronous rectification switch element; and
    first and second maximum ON width control circuits which generate first and second maximum ON width signals which each specify the maximum ON width corresponding to the synchronous rectification switch element, indicate a start timing of each of the first and second maximum ON width signals in synchronization with the ON timing of the main switch element, and indicate a maximum ON width finish timing such that the maximum ON widths specified by the first and second maximum ON width signals take on a size relationship a reverse of a size relationship between the durations of the first and second reference time signals,
    wherein when the delay time is equal to or longer than the shorter duration of the first and second reference time signals, by comparing the one of the first and second reference time signals generated with the longer duration with the delay time, the switching power source device controls whether or not to turn ON the synchronous rectification switch element in synchronization with the internal diode conduction timing, and also, after the synchronous rectification switch element is turned ON, turns OFF the synchronous rectification switch element in synchronization with a finish timing of the first and second maximum ON width signals, or with an OFF timing of the main switch element, whichever timing is earlier.

4. The switching power source device according to claim 3, wherein in the synchronous control circuit, when the delay time is equal to or shorter than the shorter duration of the first and second reference time signals, the switching power source device turns OFF the synchronous rectification switch element in synchronization with a finish timing of the first or second maximum ON width signals, whichever is indicated later, or with the OFF timing of the main switch element, whichever timing is earlier.

5. The switching power source device according to claim 2, further comprising:
   N reference time signal generation circuits which respectively generate, as the reference time signals, N reference time signals Tsrs_i of a relationship such that a duration of Tsrs_i<a duration of Tsrs_i+1 (i is a natural number 1 to (N−1), N is an integer of 3 or greater) at every ON timing of the main switch element corresponding to the synchronous rectification switch element; and
   N maximum ON width control circuits which generate N maximum ON width signals Tmot_i specifying the maximum ON width corresponding to the synchronous rectification switch element, indicate a start timing of the maximum ON width signals Tmot_i in synchronization with the ON timing of the main switch element, and indicate a finish timing of each maximum ON width signal so that a relationship is such that a duration of Tmot_i>a duration of Tmot_i+1,
   wherein when the delay time is between the duration of Tsrs_i and the duration of Tsrs_i+1, of the reference time signal durations, the switching power source device turns ON the synchronous rectification switch element in synchronization with the internal diode conduction timing, and also, turns OFF the synchronous rectification switch element in synchronization with a finish timing of the maximum ON width signal Tmot_i+1, or with the OFF timing of the main switch element, whichever timing is earlier.

6. The switching power source device according to claim 1, wherein the synchronous control circuit includes:
   an arithmetic circuit which generates a reference time signal having a predetermined duration, compares the internal diode conduction timing delay time with the reference time signal at every ON timing of the main switch element, and generates a new reference time signal (Tsrs_X) having a duration corresponding to a difference between the delay time and the reference time signal; and
   a maximum ON width control circuit which indicates a start timing of the maximum ON width of the synchronous rectification switch element in synchronization with the ON timing of the main switch element corresponding to the synchronous rectification switch element and, when the delay time exceeds the duration of the reference time signal, indicates a maximum ON width finish timing which is shorter the longer the duration of the new reference time signal,
   wherein when that the delay time is longer than the duration of the reference time signal, the switching power source device turns ON the synchronous rectification switch element in synchronization with the internal diode conduction timing, and turns OFF the synchronous rectification switch element in synchronization with a finish timing of the maximum ON width, or with the OFF timing of the main switch element, whichever timing is earlier.

7. The switching power source device according to claim 6, wherein the maximum ON width control circuit is configured so that the finish timing of the maximum ON width is continuously and variably controlled in accordance with the new reference time signal.

8. The switching power source device according to claim 1, wherein the main switch element comprises a half bridge type or full bridge type of converter which switch operates the series resonant circuit, generating an alternating current.

9. The switching power source device according to claim 1, wherein the synchronous rectification switch element comprises a MOSFET.

10. The switching power source device according to claim 9, wherein the internal diodes comprise parasite diodes.

11. A switching power source control circuit comprising:
   control circuit of a switching power source including a series resonant circuit which includes:
   a current resonant inductor and a current resonant capacitor, a plurality of main switch elements which switch a current path of the series resonant circuit by alternately turning ON and OFF,
   a transformer which induces a current from the series resonant circuit to a secondary side by ON-OFF controlling the main switch elements ON a primary side, and a plurality of synchronous rectification switch elements in which internal diodes are connected in parallel, and each is turned ON and OFF in response to one of the plurality of main switch elements, rectifying the secondary current of the transformer, the switching power source control circuit comprising:
   a detection unit which detects a conduction timing of the internal diodes by an inter-terminal voltage signal of the synchronous rectification switch element; and
   a synchronous control circuit which turns the synchronous rectification switch element ON in synchronization with the conduction timing of the internal diodes of the synchronous rectification switch element detected by the detection unit, or with the ON timing of the main switch element corresponding to the synchronous rectification switch element, whichever timing is later, and decides a maximum ON width of the synchronous rectification switch element in accordance with a delay time of the conduction timing of the internal diodes with respect to the ON timing of the main switch element,
   wherein the switching power source control circuit indicates a start timing of the maximum ON width of the synchronous rectification switch element in synchronization with the ON timing of the main switch element corresponding to the synchronous rectification switch element.

* * * * *

UNITED STATES PATENT AND TRADEMARK OFFICE
CERTIFICATE OF CORRECTION

PATENT NO. : 8,411,469 B2
APPLICATION NO. : 12/591776
DATED : April 2, 2013
INVENTOR(S) : Jian Chen et al.

It is certified that error appears in the above-identified patent and that said Letters Patent is hereby corrected as shown below:

In the Specification

Column 3, line 40, delete "Hereafter with reference" and insert --Hereafter, with reference--.

Column 13, line 27, delete " $\therefore *(R1/R2)=(1+R1/R2)*REF\ 0-A$ " and insert -- "$\therefore X*(R1/R2)=(1+R1/R2)*REF\ 0-A$" --.

Column 22, line 5, delete "from the constant current 52" and insert --from the constant current source 52--.

Signed and Sealed this
Tenth Day of September, 2013

Teresa Stanek Rea
*Acting Director of the United States Patent and Trademark Office*